(12) United States Patent
Meng et al.

(10) Patent No.: US 12,164,084 B2
(45) Date of Patent: Dec. 10, 2024

(54) OPTICAL IMAGING LENS ASSEMBLY

(71) Applicant: ZHEJIANG SUNNY OPTICS CO.,LTD., Zhejiang (CN)

(72) Inventors: Xiangyue Meng, Zhejiang (CN); Litong Song, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 636 days.

(21) Appl. No.: 17/383,458

(22) Filed: Jul. 23, 2021

(65) Prior Publication Data
US 2022/0035137 A1 Feb. 3, 2022

(30) Foreign Application Priority Data
Jul. 31, 2020 (CN) .......................... 202010756857.1

(51) Int. Cl.
*G02B 9/62* (2006.01)
*G02B 13/00* (2006.01)
*G02B 13/06* (2006.01)
*G02B 27/00* (2006.01)

(52) U.S. Cl.
CPC ........... *G02B 13/0045* (2013.01); *G02B 9/62* (2013.01); *G02B 13/06* (2013.01); *G02B 27/0025* (2013.01)

(58) Field of Classification Search
CPC ...... G02B 13/0045; G02B 9/62; G02B 13/06; G02B 27/0025; G02B 13/18; H04N 5/222; H04N 5/2254
See application file for complete search history.

(56) References Cited

U.S. PATENT DOCUMENTS

| 2020/0355891 | A1* | 11/2020 | Ye ........................... G02B 13/04 |
| 2020/0371316 | A1* | 11/2020 | Wang .................. G02B 13/0045 |
| 2020/0409123 | A1* | 12/2020 | Lou ......................... G02B 13/06 |
| 2021/0333514 | A1* | 10/2021 | Zhou .................. G02B 13/0045 |

* cited by examiner

*Primary Examiner* — Mustak Choudhury
(74) *Attorney, Agent, or Firm* — Samson G. Yu

(57) ABSTRACT

The disclosure provide an optical imaging lens assembly, which sequentially includes from an object side to an image side along an optical axis: a first lens having a negative refractive power; a second lens having a refractive power; a third lens having a refractive power; a fourth lens having a refractive power; a fifth lens having a refractive power; and a sixth lens having a positive refractive power; wherein ImgH is a half of a diagonal length of an effective pixel region on an imaging surface of the optical imaging lens assembly, ImgH satisfies: ImgH>5 mm; and Semi-FOV is a half of a maximum field of view of the optical imaging lens assembly, Semi-FOV satisfies: tan(Semi-FOV)>1.2, which makes the optical imaging lens assembly have features of a large image surface, a large wide angle, etc.

20 Claims, 14 Drawing Sheets a longitudinal aberration curve

Longitudinal aberration curve

Longitudinal aberration curve

OPTICAL IMAGING LENS ASSEMBLY

CROSS-REFERENCE TO RELATED APPLICATION(S)

The disclosure claims priority to Chinese Patent Application No. 202010756857.1, filed on Jul. 31, 2020 and entitled "Optical imaging lens assembly", the contents of which are hereby incorporated by reference in its entirety.

TECHNICAL FIELD

The disclosure relates to the field of optical elements, and particularly relates to an optical imaging lens assembly including six lenses.

BACKGROUND

As the semiconductor industry develops fast, portable electronic products are also developing extremely rapidly. For example, in a handheld apparatus, for achieving automatic stable balance and guaranteeing the high image quality requirement of imaging in the photographing process, an optical imaging lens assembly used in the handheld apparatus is required to have high resolution, and requires a larger range of the field of view.

Because the optical imaging lens assembly with a large field of view can contain more object space information during imaging, it has become a trend to develop the optical imaging lens assembly with the large field of view. Meanwhile, in order to obtain a better resolution and a more satisfactory imaging effect, the optical imaging lens assembly also needs a larger imaging surface, and as the size of the pixel is generally determined by the size of the imaging surface, the large imaging surface means higher image pixels during imaging of the optical imaging lens assembly.

Therefore, an optical imaging lens assembly with a large image surface and a large wide angle is urgently needed for a lens used by the portable electronic product at present.

SUMMARY

The disclosure provides an optical imaging lens assembly which is suitable for a portable electronic product and may at least or partially solve at least one defect in the prior art, for example, an optical imaging lens assembly with an ultra-large image surface and an ultra-large wide angle.

Some embodiments of the disclosure provide such an optical imaging lens assembly, the optical imaging lens assembly may sequentially include from an object side to an image side along an optical axis: a first lens having a negative refractive power; a second lens having a refractive power; a third lens having a refractive power; a fourth lens having a refractive power; a fifth lens having a refractive power; and a sixth lens having a positive refractive power.

In an implementation mode, ImgH is a half of a diagonal length of an effective pixel region on an imaging surface of the optical imaging lens assembly, ImgH may satisfy: ImgH>5 mm.

In an implementation mode, Semi-FOV is a half of a maximum field of view of the optical imaging lens assembly, Semi-FOV may satisfy: tan(Semi-FOV)>1.2.

In an implementation mode, RI is a relative illuminance corresponding to the maximum field of view of the optical imaging lens assembly, RI may satisfy: RI≥40%.

In an implementation mode, R9 is a curvature radius of an object-side surface of the fifth lens, and f5 is an effective focal length of the fifth lens, R9 and f5 may satisfy:

$1.0<|f5/R9|<2.5$.

In an implementation mode, f6 is an effective focal length of the sixth lens, and f is a total effective focal length of the optical imaging lens assembly, f6 and f may satisfy: $2.00<f6/f<3.50$.

In an implementation mode, CT1 is a center thickness of the first lens on an optical axis, CT2 is a center thickness of the second lens on the optical axis, CT3 is a center thickness of the third lens on the optical axis, and T12, an air gap between the first lens and the second lens on the optical axis, CT1, CT2 and CT3 may satisfy: $3.50<(CT1+CT2+CT3)/T12<7.00$.

In an implementation mode, R7 is a curvature radius of an object-side surface of the fourth lens, and f is a total effective focal length of the optical imaging lens assembly, R7 and f may satisfy: $2.0<R7/f<7.5$.

In an implementation mode, ΣCT is the sum of center thicknesses of the first lens to the sixth lens on the optical axis, and ΣAT is the sum of the spacing distances between any two adjacent lenses of the first lens to the sixth lens on the optical axis in the optical imaging lens assembly, ΣCT and ΣAT may satisfy: $2.0<\Sigma CT/\Sigma AT<3.5$.

In an implementation mode, T45 is an air gap between the fourth lens and the fifth lens on the optical axis and T56 is an air gap between the fifth lens and the sixth lens on the optical axis, T45 and T56 may satisfy: $T45/T56<1.0$.

In an implementation mode, SAG22 is an on-axis distance from an intersection point of an image-side surface of the second lens and the optical axis to an effective radius vertex of the image-side surface of the second lens, and SAG42 is an on-axis distance from an intersection point of an image-side surface of the fourth lens and the optical axis to an effective radius vertex of the image-side surface of the fourth lens, SAG22 and SAG42 may satisfy: $1.4<|SAG22/SAG42|<2.0$.

In an implementation mode, f23 is a combined focal length of the second lens and the third lens, and f is a total effective focal length of the optical imaging lens assembly, f23 and f may meet: $1.0<f23/f<2.5$.

In an implementation mode, ET1 is an edge thickness of the first lens, ET2 is an edge thickness of the second lens, and T12 is an air gap between the first lens and the second lens on the optical axis, ET1, ET2 and T12 may meet: $2.5<(ET1+ET2)/T12<6.0$.

In an exemplary embodiment, TTL is a distance from an object-side surface of the first lens to the imaging surface on the optical axis, and TD is a distance from the object-side surface of the first lens to the image-side surface of the sixth lens on the optical axis, TTL and TD may meet $0.7<TD/TTL<0.8$.

In an implementation mode, TTL is a distance from an object-side surface of the first lens to the imaging surface on the optical axis, and BFL is a distance from an image-side surface of the sixth lens to the imaging surface on the optical axis, TTL and BFL may meet $3.0<TTL/BFL≤5.0$.

In an implementation mode, SAG51 is an on-axis distance from an intersection point of an object-side surface of the fifth lens and the optical axis to an effective radius vertex of the object-side surface of the fifth lens, SAG52 is an on-axis distance from an intersection point of the image-side surface of the fifth lens and the optical axis to an effective radius vertex of the image-side surface of the fifth lens, and CT5 is a center thickness of the fifth lens on the optical axis, SAG51, SAG52 and CT5 may meet $1.30<(|SAG51|+|SAG52|)/CT5<6.00$.

Some other embodiments of the disclosure provide such an optical imaging lens assembly, the optical imaging lens assembly may sequentially include from an object side to an image side along an optical axis: a first lens having a refractive power, an object-side surface thereof being a concave surface; a second lens having a refractive power;
a third lens having a refractive power, an object-side surface thereof being a convex surface; a fourth lens having a refractive power; a fifth lens having a refractive power; and
a sixth lens having a positive refractive power.

In an implementation mode, ImgH is a half of a diagonal length of an effective pixel region on an imaging surface of the optical imaging lens assembly, ImgH may meet ImgH>5 mm.

In an implementation mode, RI is a relative illuminance corresponding to the maximum field of view of the optical imaging lens assembly, RI may satisfy: RI≥40%.

In an implementation mode, R9 is a curvature radius of an object-side surface of the fifth lens, and f5 is an effective focal length of the fifth lens, R9 and f5 may satisfy: $1.0<|f5/R9|<2.5$.

In an implementation mode, f6 is an effective focal length of the sixth lens, and f is a total effective focal length of the optical imaging lens assembly, f6 and f may satisfy: $2.00<f6/f<3.50$.

In an implementation mode, CT1 is a center thickness of the first lens on an optical axis, CT2 is a center thickness of the second lens on the optical axis, CT3 is a center thickness of the third lens on the optical axis, and T12 is an air gap between the first lens and the second lens on the optical axis, CT1, CT2, CT3 and T12 may satisfy: $3.50<(CT1+CT2+CT3)/T12<7.00$.

In an implementation mode, R7 is a curvature radius of an object-side surface of the fourth lens, and f is a total effective focal length of the optical imaging lens assembly, R7 and f may satisfy: $2.0<R7/f<7.5$.

In an implementation mode, $\Sigma CT$ is the sum of center thicknesses of the first lens to the sixth lens on the optical axis, and $\Sigma AT$ is the sum of the spacing distances between any two adjacent lenses of the first lens to the sixth lens on the optical axis in the optical imaging lens assembly, $\Sigma CT$ and $\Sigma AT$ may satisfy: $2.0<\Sigma CT/\Sigma AT<3.5$.

In an implementation mode, T45 is an air gap between the fourth lens and the fifth lens on the optical axis and T56 is an air gap between the fifth lens and the sixth lens on the optical axis, T45 and T56 may satisfy: $T45/T56<1.0$.

In an implementation mode, SAG22 is an on-axis distance from an intersection point of an image-side surface of the second lens and the optical axis to an effective radius vertex of the image-side surface of the second lens, and SAG42 is an on-axis distance from an intersection point of an image-side surface of the fourth lens and the optical axis to an effective radius vertex of the image-side surface of the fourth lens, SAG22 and SAG42 may satisfy: $1.4<|SAG22/SAG42|<2.0$.

In an implementation mode, f23 is a combined focal length of the second lens and the third lens, and f is a total effective focal length of the optical imaging lens assembly, f23 and f may satisfy: $1.0<f23/f<2.5$.

In an implementation mode, ET1 is an edge thickness of the first lens, ET2 is an edge thickness of the second lens, and T12 is an air gap between the first lens and the second lens on the optical axis, ET1, ET2 and T12 may satisfy: $2.5<(ET1+ET2)/T12<6.0$.

In an implementation mode, TTL is a distance from an object-side surface of the first lens to the imaging surface on the optical axis, and TD is a distance from the object-side surface of the first lens to the image-side surface of the sixth lens on the optical axis, TTL and TD may satisfy: $0.7<TD/TTL<0.8$.

In an implementation mode, TTL is a distance from an object-side surface of the first lens to the imaging surface on the optical axis, and BFL is a distance from an image-side surface of the sixth lens to the imaging surface on the optical axis, TTL and BFL may satisfy: $3.0<TTL/BFL\leq5.0$.

In an implementation mode, SAG51 is an on-axis distance from an intersection point of an object-side surface of the fifth lens and the optical axis to an effective radius vertex of the object-side surface of the fifth lens, SAG52 is an on-axis distance from an intersection point of the image-side surface of the fifth lens and the optical axis to an effective radius vertex of the image-side surface of the fifth lens, and CT5 is a center thickness of the fifth lens on the optical axis, SAG51, SAG52 and CT5 may satisfy: $1.30<(|SAG51|+|SAG52|)/CT5<6.00$.

An optical imaging lens assembly provided by the disclosure employs a plurality of lenses, for example, the first lens to the sixth lens, an image height and a maximum field of view of the optical imaging lens assembly are reasonably controlled, a refractive power and a surface type of each lens are optimally set, accordingly, the optical imaging lens assembly can achieve the features of ultra-large image surface, ultra-large wide angle, high imaging quality, etc., and meanwhile, each lens is compact in structure and good in forming machining performance, which may improve the production yield of the camera module.

BRIEF DESCRIPTION OF THE DRAWINGS

Other features, objectives, and advantages of the disclosure will become more apparent by means of the detailed description on non-limiting embodiments in conjunction with the drawings. In the drawings.

DETAILED DESCRIPTION OF THE EMBODIMENTS

Figure 1:
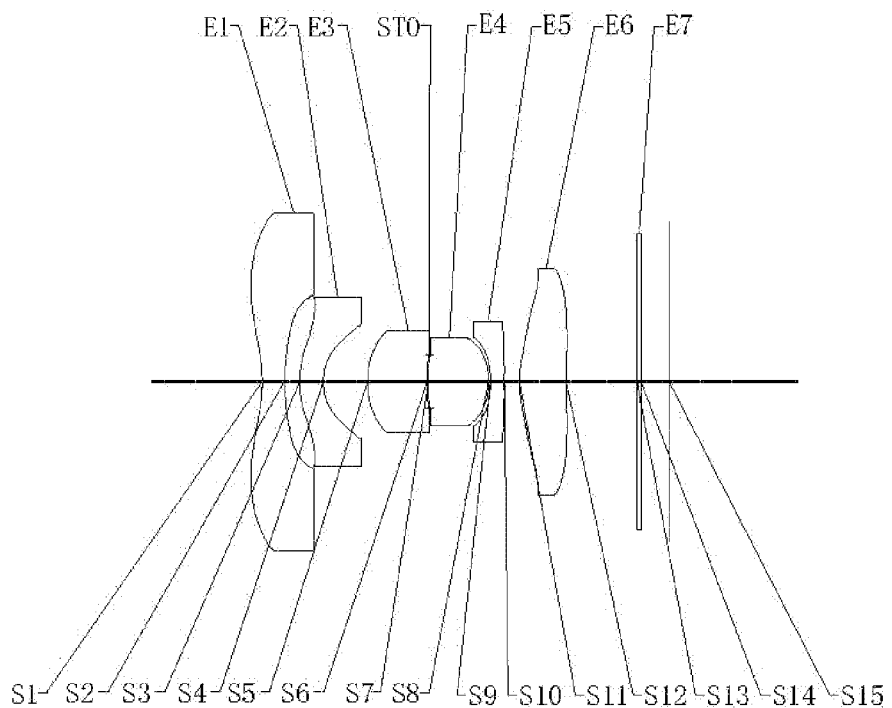
FIG. 1 shows a structural schematic diagram of an optical imaging lens assembly according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. Same reference numerals refer to same elements throughout the specification. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease of illustration. In particular, a spherical shape or an aspheric shape shown in the drawings is shown by some embodiments. That is, the spherical shape or the aspheric shape is not limited to the spherical shape or the aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by the general technical personnel in the field of the disclosure. It should also be understood that terms (for example, terms defined in commonly used dictionaries) should be interpreted as having a meaning that is consistent with their meaning in the context of the relevant art and will not be interpreted in an idealized or overly formal sense unless expressly so defined herein.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

The optical imaging lens assembly according to the exemplary implementation mode of the disclosure may include six lenses having refractive power, which are a first lens, a second lens, a third lens, a fourth lens, a fifth lens and a sixth lens. These six lenses are sequentially arranged along an optical axis from an object side to an image side. An air gap may be provided between every two adjacent lenses from the first lens to the sixth lens.

In an exemplary implementation mode, the first lens may have a negative refractive power; the second lens may have a positive refractive power or negative refractive power; the third lens may have a positive refractive power or negative refractive power; the fourth lens may have a positive refractive power or negative refractive power; the fifth lens may have a positive refractive power or negative refractive power; and the sixth lens may have a positive refractive power. The refractive power and the surface type of each lens in the optical system are reasonably matched, accordingly, the rationality of the optical imaging lens assembly structure is guaranteed, and various aberrations in the optical imaging system may be balanced and corrected.

In an exemplary implementation mode, an object-side surface of the first lens may be a concave surface, and an image-side surface may be a concave surface.

In an exemplary implementation mode, an object-side surface of the second lens may be a convex surface, and an image-side surface may be a concave surface.

In an exemplary implementation mode, an object-side surface of the third lens may be a convex surface.

In an exemplary implementation mode, an object-side surface of the fourth lens may be a convex surface, and an image-side surface may be a convex surface.

In an exemplary implementation mode, an object-side surface of the fifth lens may be a concave surface.

In an exemplary implementation mode, an object-side surface of the sixth lens may be a convex surface.

In an exemplary implementation mode, ImgH is a half of a diagonal length of an effective pixel region on an imaging surface of the optical imaging lens assembly, ImgH may satisfy: ImgH>5 mm. The size of half of the diagonal length of the effective pixel region on the imaging surface of the optical imaging lens assembly is rationally controlled, which may guarantee the optical imaging lens assembly to have a small lens size while having high-definition imaging quality.

In an exemplary implementation mode, Semi-FOV is a half of a maximum field of view of the optical imaging lens assembly, Semi-FOV may satisfy: tan(Semi-FOV)>1.2. More specifically, Semi-FOV may satisfy 1.4<tan(Semi-FOV)<5.0. The value range of the maximum field of view of the optical imaging lens assembly is rationally controlled, which may guarantee that the optical imaging lens assembly has a large angle.

In an exemplary implementation mode, RI is a relative illuminance corresponding to the maximum field of view of the optical imaging lens assembly, RI may satisfy: RI≥40%. More specifically, RI may satisfy 40%≤RI≤60%. The relative illuminance corresponding to the maximum field of view of the optical imaging lens assembly is rationally controlled, such that an optical imaging system with high image quality may be obtained, and the phenomenon that an edge of the optical imaging lens assembly has a dark corner due to insufficient illuminance may be prevented.

In an exemplary implementation mode, R9 is a curvature radius of an object-side surface of the fifth lens, and f5 is an effective focal length of the fifth lens, R9 and f5 may satisfy: 1.0<|f5/R9|<2.5. More specifically, |f5/R9| may satisfy 1.2<|f5/R9|<2.2. The ratio of the effective focal length of the fifth lens to the curvature radius of the object-side surface is controlled within a rational numerical range, such that the effective focal length of the fifth lens may be effectively limited, the refractive power of the optical imaging system may be rationally distributed, and a field area of the optical imaging lens assembly may be corrected.

In an exemplary implementation mode, f6 is an effective focal length of the sixth lens, and f is a total effective focal length of the optical imaging lens assembly, f6 and f may satisfy: 2.00<f6/f<3.50. The ratio of the effective focal length of the sixth lens to the total effective focal length of the optical imaging lens assembly is controlled within a rational numerical range, such that the effective focal length of the sixth lens may be effectively limited, axial chromatic aberration of an optical imaging system may be corrected, and the risk of a purple boundary in imaging is reduced.

In an exemplary implementation mode, CT1 is a center thickness of the first lens on an optical axis, CT2 is a center thickness of the second lens on the optical axis, CT3 is a center thickness of the third lens on the optical axis, and T12 is an air gap between the first lens and the second lens on the optical axis, CT1, CT2, CT3 and T12 may satisfy: 3.50<(CT1+CT2+CT3)/T12<7.00. The mutual relation between the central thicknesses of the first lens, the second lens and the third lens on the optical axis and the air gap between the first lens and the second lens on the optical axis is rationally controlled, such that the lens thicknesses and the air gaps of the first lens, the second lens and the third lens may be rationally distributed, and correction of vertical axis aberration of the optical imaging lens assembly is facilitated, and meanwhile, the process requirement for producing the optical imaging lens assembly is met.

In an exemplary implementation mode, R7 is a curvature radius of an object-side surface of the fourth lens, and f is a total effective focal length of the optical imaging lens assembly, R7 and f may satisfy: 2.0<R7/f<7.5. The ratio of the effective focal length of the fourth lens to the curvature radius of the object-side surface is controlled in a rational numerical range, such that the shape of the fourth lens may be effectively limited, and monochromatic aberration in the optical imaging system may be balanced.

In an exemplary implementation mode, ΣCT is the sum of center thicknesses of the first lens to the sixth lens on the optical axis, and ΣAT is the sum of the spacing distances between any two adjacent lenses of the first lens to the sixth lens on the optical axis in the optical imaging lens assembly, ΣCT and ΣAT may satisfy: 2.0<ΣCT/ΣAT<3.5. The ratio of the sum of the center thicknesses of the first lens to the sixth lens on the optical axis to the sum of the spacing distances between any two adjacent lenses of the first lens to the sixth lens on the optical axis in the optical imaging lens assembly is controlled within a rational numerical range, such that the central thickness of each lens and the air gap between the adjacent lenses in the optical imaging system may be rationally distributed, various aberrations of the optical imaging lens assembly may be balanced, and ghost images in imaging may be reduced.

In an exemplary implementation mode, T45 is an air gap between the fourth lens and the fifth lens on the optical axis, T56 is an air gap between the fifth lens and the sixth lens on the optical axis, T45 and T56 may satisfy: T45/T56<1.0. More specifically, T45/T56 may satisfy 0.1<T45/T56<1.0. The ratio of the air gap between the fourth lens and the fifth lens to the air gap between the fifth lens and the sixth lens on the optical axis is controlled in a rational numerical range, such that the air gaps between the fourth lens, the fifth lens and the sixth lens in the optical imaging system may be effectively balanced, and the vertical axis chromatic aberration of the optical imaging lens assembly may be balanced.

In an exemplary implementation mode, SAG22 is an on-axis distance from an intersection point of an image-side surface of the second lens and the optical axis to an effective radius vertex of the image-side surface of the second lens, and SAG42 is an on-axis distance from an intersection point of an image-side surface of the fourth lens and the optical axis to an effective radius vertex of the image-side surface of the fourth lens, SAG22 and SAG42 may satisfy: 1.4<|SAG22/SAG42|<2.0. The ratio of the vector height of the image-side surface of the second lens to the vector height of the image-side surface of the fourth lens is controlled within a rational numerical range, such that the manufacturability of the optical imaging lens assembly is improved, for example, when the ratio is too large, the manufacturability of the optical imaging lens assembly is poor, and when the ratio is too small, the field curvature of the off-axis field of view of the optical imaging lens assembly is not easy to correct.

In an exemplary implementation mode, f23 is a combined focal length of the second lens and the third lens, and f is a total effective focal length of the optical imaging lens assembly, f23 and f may satisfy: 1.0<f23/f<2.5. More specifically, f23/f may satisfy 1.3<f23/f<2.3. The ratio of the combined focal length of the second lens and the third lens to the total effective focal length of the optical imaging lens assembly is controlled in a rational numerical range, such that axial chromatic aberration of the optical imaging system is corrected, and the imaging effect of the optical imaging lens assembly is improved.

In an exemplary implementation mode, ET1 is an edge thickness of the first lens, ET2 is an edge thickness of the second lens, and T12 is an air gap between the first lens and the second lens on the optical axis, ET1, ET2 and T12 may satisfy: 2.5<(ET1+ET2)/T12<6.0. The mutual relation between the edge thickness of the first lens, the edge thickness of the second lens and the air gap between the first lens and the second lens on the optical axis is rationally controlled, such that the technological requirement for producing the optical imaging lens assembly is met while the influence of spherical aberration in the optical imaging system is reduced.

In an exemplary implementation mode, TTL is a distance from an object-side surface of the first lens to the imaging surface on the optical axis, and TD is a distance from the object-side surface of the first lens to the image-side surface of the sixth lens on the optical axis, TTL and TD may satisfy: 0.7<TD/TTL<0.8. The ratio of the total optical length of the optical imaging lens assembly to the distance from the object-side surface of the first lens to the image-side surface of the sixth lens on the optical axis is controlled within a rational numerical range, such that the technological requirement for producing the optical imaging lens assembly is met while the astigmatism of the optical imaging system is corrected.

In an exemplary implementation mode, TTL is a distance from an object-side surface of the first lens to the imaging surface on the optical axis, and BFL is a distance from an image-side surface of the sixth lens to the imaging surface on the optical axis, TTL and BFL may satisfy: $3.0<TTL/BFL\leq5.0$. More specifically, TTL and BFL may satisfy $3.3<TTL/BFL\leq5.0$. The ratio of the total optical length of the optical imaging lens assembly to the distance from the image-side surface of the sixth lens to the imaging surface on the optical axis is controlled within a rational numerical range, such that the technological requirement for producing the optical imaging lens assembly is met while a chip of a photographing module is matched.

In an exemplary implementation mode, SAG51 is an on-axis distance from an intersection point of an object-side surface of the fifth lens and the optical axis to an effective radius vertex of the object-side surface of the fifth lens, SAG52 is an on-axis distance from an intersection point of the image-side surface of the fifth lens and the optical axis to an effective radius vertex of the image-side surface of the fifth lens, and CT5 is a center thickness of the fifth lens on the optical axis, SAG51, SAG51 and CT5 may satisfy: $1.30<(|SAG51|+|SAG52|)/CT5<6.00$. The mutual relation among the vector height of the object-side surface and the vector height of the image-side surface of the fifth lens and the center thickness of the fifth lens on the optical axis is rationally controlled, such that the optical imaging lens assembly with high imaging quality may be obtained while the technological requirement for producing the optical imaging lens assembly is met.

In an exemplary implementation mode, the optical imaging lens assembly may also include diaphragm. The diaphragm may be disposed at a proper position as required. For example, the diaphragm may be disposed between the third lens and the fourth lens. Optionally, the optical imaging lens assembly may further include an optical filter used for correcting color deviation, and/or a protective glass used for protecting a photosensitive element located on the imaging surface.

The disclosure provides an optical imaging lens assembly which has the features of ultra-large image surface, ultra-large wide angle, etc. The optical imaging lens assembly according to the above implementation mode of the disclosure may employ a plurality of lenses, for example, six lenses described above. By reasonably distributing the refractive power of each lens, the surface types, the center thickness of each lens, the on-axis distance between the lenses, etc., incident light may be effectively converged, a total optical length of the imaging lens is reduced, the machinability of the imaging lens is improved, and accordingly, the optical imaging lens assembly is more easy to produce and machine.

In an exemplary implementation mode, at least one of the mirror surfaces of each lens is an aspheric mirror surface, that is, at least one mirror surface from an object-side surface of the first lens to an image-side surface of the sixth lens is an aspheric mirror surface. The aspheric lens is characterized in that the curvature is continuously changed from a center of the lens to a periphery of the lens. Different from a spherical lens having a constant curvature from the center of the lens to the periphery of the lens, the aspheric lens has a better feature of a curvature radius and has the advantages of improving distortion aberration and astigmatism aberration. After the aspheric lens is used, aberration occurring during imaging may be eliminated as much as possible, thereby improving the imaging quality. Optionally, at least one of the object-side surface and the image-side surface of each of the first lens, the second lens, the third lens, the fourth lens, the fifth lens and the sixth lens is an aspheric mirror surface. Optionally, the object-side surface and the image-side surface of each of the first lens, the second lens, the third lens, the fourth lens, the fifth lens and the sixth lens is aspheric mirror surfaces.

The disclosure also provides an imaging device, wherein the electronic photosensitive element may be a Charge Coupled Device (CCD) or a Complementary Metal Oxide Semiconductor (CMOS). The imaging device may be a standalone imaging apparatus, for example, a digital camera, or may be an imaging module integrated on a mobile electronic apparatus, for example, a cell phone. The imaging device is equipped with the optical imaging lens assembly described above.

However, it should be understood by those skilled in the art that the number of lenses constituting the optical imaging lens assembly may be varied to obtain various results and advantages described in this specification without departing from the claimed technical solution. For example, although described with six lenses as an example in an embodiment, the optical imaging lens assembly is not limited to including six lenses. The optical imaging lens assembly may also include other numbers of lenses if desired.

Specific embodiments of the optical imaging lens assembly that may be suitable for use in the above implementation mode are described further below with reference to the accompanying drawings.

Embodiment 1

An optical imaging lens assembly according to Embodiment 1 of the disclosure is described below with reference to FIGS. 1-2C. FIG. 1 shows a structural schematic diagram of an optical imaging lens assembly according to Embodiment 1 of the disclosure.

As shown in FIG. 1, the optical imaging lens assembly sequentially includes from an object side to an image side along an optical axis: a first lens E1, a second lens E2, a third lens E3, a diaphragm STO, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a convex surface, and an image-side surface S12 thereof is a concave surface. The optical filter E7 has an object-side surface S13 and an image-side surface S14. Light from an object sequentially passes through each of the surfaces from S1 to S14 and is finally imaged on the imaging surface S15.

Table 1 shows a table of basic parameters of the optical imaging lens assembly of Embodiment 1, wherein the units of the curvature radius, thickness, and focal length are all millimeters (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinity | Infinity | | | | |
| S1 | Aspheric | −7.6487 | 1.1181 | 1.55 | 56.1 | −6.57 | −6.9071 |
| S2 | Aspheric | 7.1208 | 0.7727 | | | | −2.2300 |
| S3 | Aspheric | 4.8860 | 1.1870 | 1.55 | 56.1 | −18.68 | −10.1192 |
| S4 | Aspheric | 3.0205 | 2.2324 | | | | −0.1912 |
| S5 | Aspheric | 4.5914 | 3.0000 | 1.83 | 41.0 | 5.95 | 0.7089 |
| S6 | Aspheric | 61.9815 | 0.1297 | | | | 84.6690 |
| STO | Spherical | Infinity | −0.0697 | | | | |
| S7 | Aspheric | 35.5068 | 3.0275 | 1.55 | 56.1 | 6.18 | −87.1678 |
| S8 | Aspheric | −3.6224 | 0.1083 | | | | 0.9314 |
| S9 | Aspheric | −4.7092 | 0.6774 | 1.68 | 19.2 | −6.14 | 2.1826 |
| S10 | Aspheric | 60.8699 | 0.7800 | | | | 94.6004 |
| S11 | Aspheric | 5.2218 | 2.3490 | 1.55 | 56.1 | 10.37 | −16.3212 |
| S12 | Aspheric | 55.9340 | 3.5636 | | | | −90.8673 |
| S13 | Spherical | Infinity | 0.2100 | 1.51 | 64.2 | | |
| S14 | Spherical | Infinity | 1.4194 | | | | |
| S15 | Spherical | Infinity | | | | | |

In this embodiment, the total effective focal length of the optical imaging lens assembly f=5.00 mm, the distance from the object-side surface S1 of the first lens E1 to the imaging surface S15 on the optical axis TTL=20.50 mm, the half of the diagonal length of the effective pixel region on the imaging surface S15 ImgH=7.94 mm, half of the maximum field of view of the optical imaging lens assembly Semi-FOV=78.54°, the f number of the optical imaging lens assembly Fno=3.00, and the relative illuminance corresponding to the maximum field of view of the optical imaging lens assembly RI=46%.

In Embodiment 1, both of the object-side surface and the image-side surface of any one of the first lens E1 to the sixth lens E6 are aspheric surface, and the surface type x of each aspheric lens may be defined by, but is not limited to, the aspheric formula:

$$x = \frac{ch^2}{1 + \sqrt{1 - (k+1)c^2h^2}} + \sum A_i h^i, \quad (1)$$

wherein x is a vector height of a distance between the aspheric surface and a vertex of the aspheric surface when the aspheric surface is located at a position with the height h in the optical axis direction; c is a paraxial curvature of the aspheric surface, c=1/R (that is, the paraxial curvature c is the reciprocal of curvature radius R in Table 1 above); k is a conic coefficient; and $A_i$ is a correction coefficient of the i-th order of the aspheric surface. Table 2 below gives higher order term coefficients $A_4$, $A_6$, $A_8$, $A_{10}$, $A_{12}$, $A_{14}$, $A_{16}$, $A_{18}$ and $A_{20}$ that may be used for each of the aspheric mirror surfaces S1-S12 in Embodiment 1.

TABLE 2

| Surface number | A4 | A6 | A8 | A10 | A12 |
|---|---|---|---|---|---|
| S1 | 1.3262E−03 | −2.2750E−05 | 2.3370E−07 | −5.3290E−10 | −9.6436E−12 |
| S2 | −1.0517E−02 | 1.7540E−03 | −1.7425E−04 | 1.2888E−05 | −6.3017E−07 |
| S3 | 3.2280E−03 | −1.0917E−04 | −5.8209E−05 | 6.6397E−06 | −3.2661E−07 |
| S4 | 1.2978E−02 | 3.1685E−04 | −2.7767E−04 | −5.3610E−05 | 1.5187E−05 |
| S5 | 2.8719E−03 | −1.4169E−04 | 7.5671E−05 | −2.4940E−05 | 4.6509E−06 |
| S6 | 2.6566E−02 | −1.6134E−02 | 2.4394E−02 | −2.2898E−02 | 1.2553E−02 |
| S7 | 2.9456E−02 | −1.5687E−02 | 1.7777E−02 | −1.4877E−02 | 7.3736E−03 |
| S8 | −3.2265E−03 | 9.0088E−03 | −9.2282E−03 | 3.3491E−03 | −5.8416E−04 |
| S9 | −1.1256E−02 | 1.6938E−02 | −1.2023E−02 | 3.8064E−03 | −6.3444E−04 |
| S10 | −2.0085E−02 | 1.2295E−02 | −4.6863E−03 | 1.1561E−03 | −1.8899E−04 |
| S11 | −1.8428E−03 | 3.3540E−04 | −3.0726E−05 | 1.2726E−06 | 2.7202E−08 |
| S12 | 5.6280E−04 | −4.2487E−04 | 6.4920E−05 | −6.2207E−06 | 4.0134E−07 |

| Surface number | A14 | A16 | A18 | A20 |
|---|---|---|---|---|
| S1 | 3.2424E−14 | 4.4217E−16 | 0.0000E+00 | 0.0000E+00 |
| S2 | 1.7987E−08 | −2.1761E−10 | 0.0000E+00 | 0.0000E+00 |
| S3 | 7.9931E−09 | −7.8941E−11 | 0.0000E+00 | 0.0000E+00 |
| S4 | −1.2045E−06 | 3.1507E−08 | 0.0000E+00 | 0.0000E+00 |
| S5 | −4.2152E−07 | 1.6502E−08 | 0.0000E+00 | 0.0000E+00 |
| S6 | −3.6411E−03 | 4.3511E−04 | 0.0000E+00 | 0.0000E+00 |

TABLE 2-continued

| | | | | |
|---|---|---|---|---|
| S7 | −1.9495E−03 | 2.1269E−04 | 0.0000E+00 | 0.0000E+00 |
| S8 | 4.8639E−05 | −1.4881E−06 | 0.0000E+00 | 0.0000E+00 |
| S9 | 5.5588E−05 | −2.1129E−06 | 0.0000E+00 | 0.0000E+00 |
| S10 | 2.0507E−05 | −1.4247E−06 | 5.7344E−08 | −1.0148E−09 |
| S11 | −6.0392E−09 | 3.0513E−10 | −7.1139E−12 | 6.5159E−14 |
| S12 | −1.7240E−08 | 4.6843E−10 | −7.2183E−12 | 4.7585E−14 |

Figure 2A:
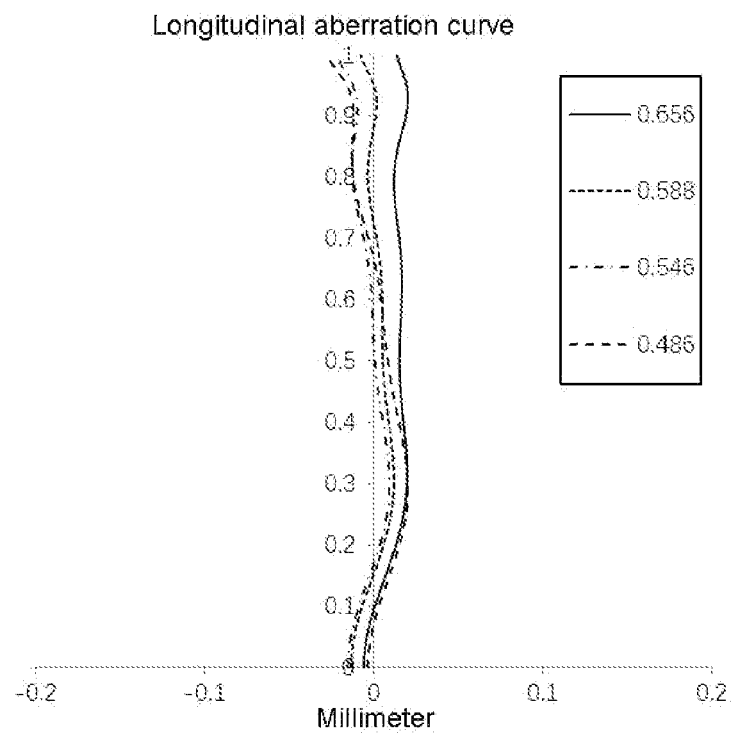
FIGS. 2A-2C show an optical imaging lens group, an astigmatism curve and a relative illuminance curve of the optical imaging lens assembly in Embodiment 1 respectively.
Figure 2B:
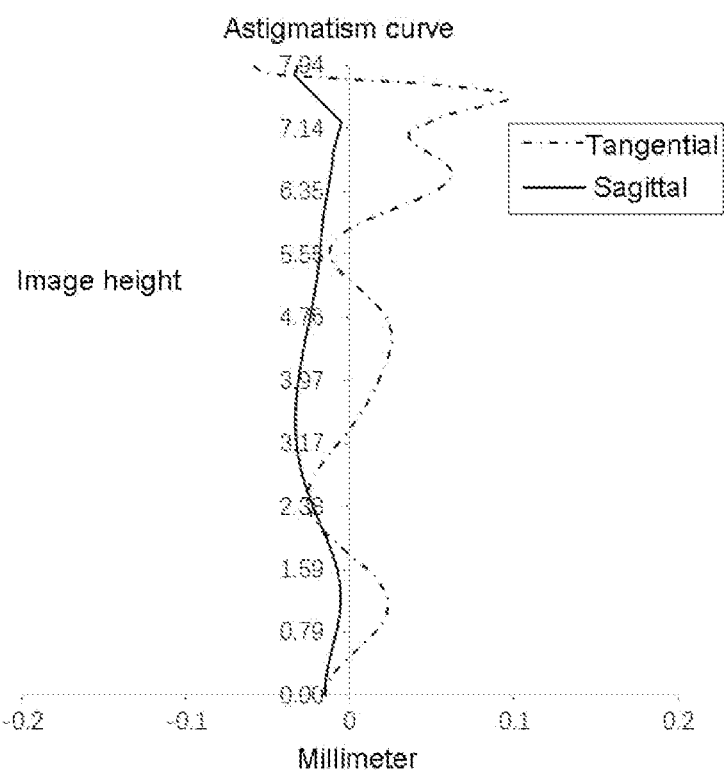
Figure 2C:
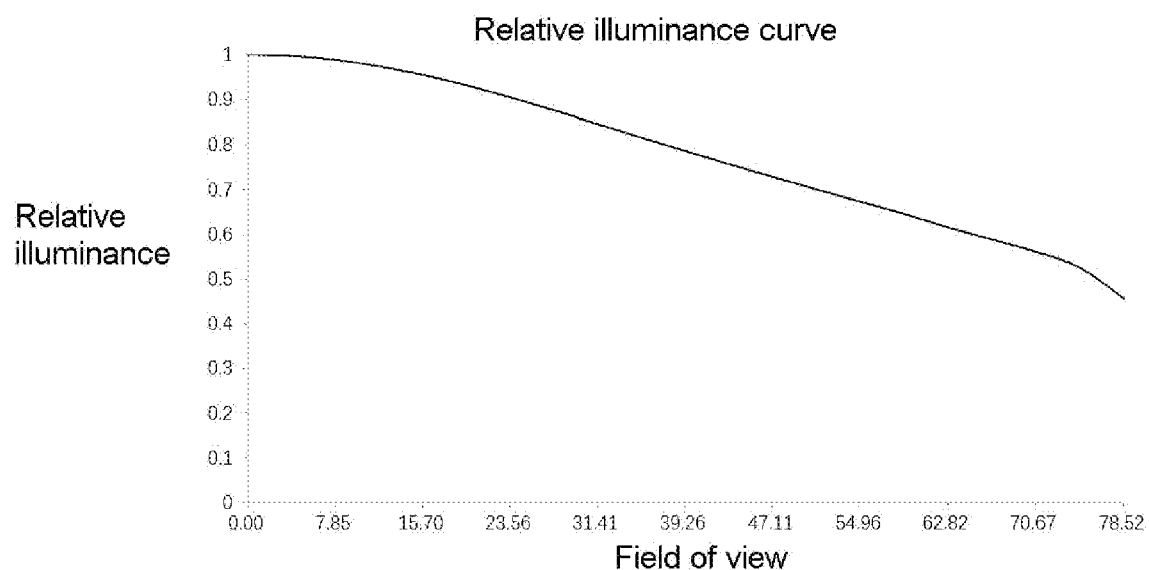

FIG. 2A shows an optical imaging lens group of the optical imaging lens assembly in Embodiment 1, which represents that a convergence focus of light rays of different wavelengths is deviated after the light rays pass through the lens. FIG. 2B shows an astigmatism curve of the optical imaging lens assembly of Embodiment 1, which represents a curvature of tangential image surface and a curvature of sagittal image surface. FIG. 2C shows a relative illuminance curve of the optical imaging lens assembly of Embodiment 1, which represents relative illuminance values corresponding to different fields of view. FIGS. 2A-2C show that the optical imaging lens assembly provided in Embodiment 1 is capable of achieving good imaging quality.

Embodiment 2

Figure 3:
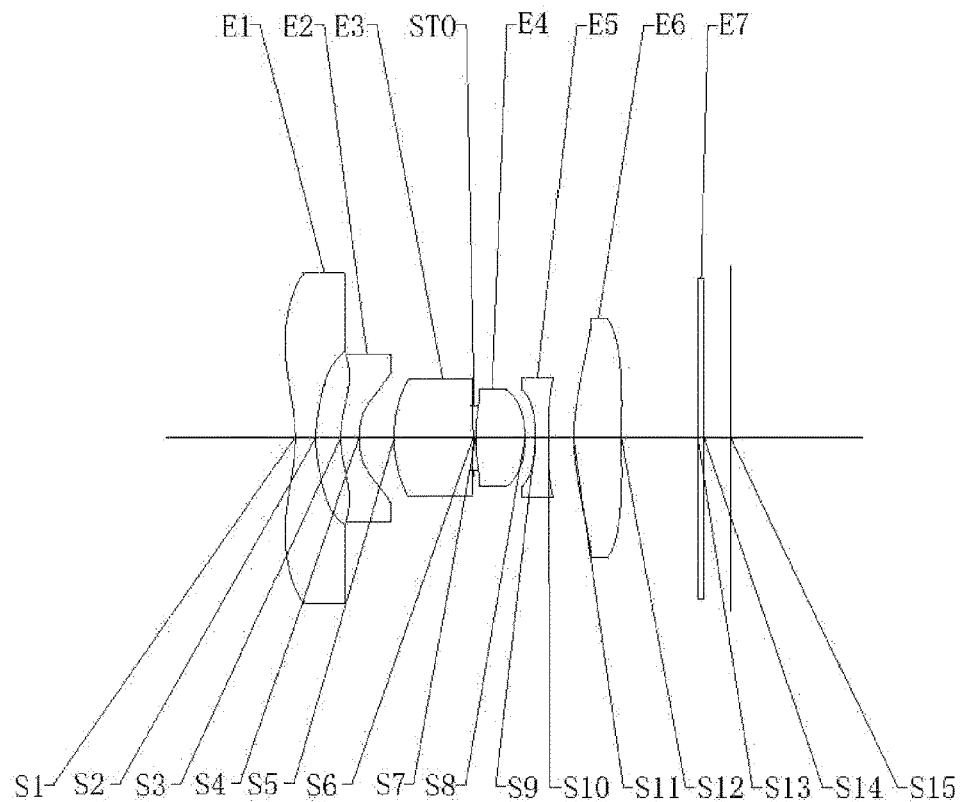
FIG. 3 shows a structural schematic diagram of an optical imaging lens assembly according to Embodiment 2 of the disclosure.

An optical imaging lens assembly according to Embodiment 2 of the disclosure is described below with reference to FIGS. 3-4C. FIG. 3 shows a structural schematic diagram of an optical imaging lens assembly according to Embodiment 2 of the disclosure.

As shown in FIG. 3, the optical imaging lens assembly sequentially includes from an object side to an image side along an optical axis: a first lens E1, a second lens E2, a third lens E3, a diaphragm STO, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a convex surface, and an image-side surface S12 thereof is a concave surface. The optical filter E7 has an object-side surface S13 and an image-side surface S14. Light from an object sequentially passes through each of the surfaces from S1 to S14 and is finally imaged on the imaging surface S15.

In this embodiment, the total effective focal length of the optical imaging lens assembly f=5.07 mm, the distance from the object-side surface S1 of the first lens E1 to the imaging surface S15 on the optical axis TTL=20.39 mm, the half of the diagonal length of the effective pixel region on the imaging surface S15 ImgH=7.93 mm, half of the maximum field of view of the optical imaging lens assembly Semi-FOV=77.52°, the f number of the optical imaging lens assembly Fno=2.99, and the relative illuminance corresponding to the maximum field of view of the optical imaging lens assembly RI=42%.

Table 3 shows a table of basic parameters of the optical imaging lens assembly of Embodiment 2, wherein the units of the curvature radius, thickness, and focal length are all millimeters (mm).

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinity | Infinity | | | | |
| S1 | Aspheric | −8.3029 | 0.9752 | 1.55 | 56.1 | −6.28 | −6.9104 |
| S2 | Aspheric | 6.0858 | 1.1661 | | | | −0.2939 |
| S3 | Aspheric | 5.7169 | 0.8480 | 1.55 | 56.1 | −19.91 | −25.5005 |
| S4 | Aspheric | 3.5515 | 1.6512 | | | | −0.3215 |
| S5 | Aspheric | 7.1863 | 3.7000 | 1.83 | 41.0 | 7.13 | 0.5380 |
| S6 | Aspheric | −23.3821 | 0.0435 | | | | 83.8991 |
| STO | Spherical surface | Infinity | 0.0665 | | | | |
| S7 | Aspheric | 10.8398 | 2.3272 | 1.55 | 56.1 | 5.94 | −82.2900 |
| S8 | Aspheric | −4.2834 | 0.4946 | | | | 1.2452 |
| S9 | Aspheric | −5.6665 | 0.5937 | 1.68 | 19.2 | −6.93 | 2.2111 |
| S10 | Aspheric | 29.0601 | 1.1487 | | | | 88.1713 |
| S11 | Aspheric | 6.6421 | 2.2390 | 1.55 | 56.1 | 12.82 | −14.2025 |
| S12 | Aspheric | 112.2313 | 3.5885 | | | | 97.1949 |
| S13 | Spherical | Infinity | 0.3000 | 1.51 | 64.2 | | |
| S14 | Spherical | Infinity | 1.2496 | | | | |
| S15 | Spherical | Infinity | | | | | |

In Embodiment 2, both of the object-side surface and the image-side surface of any one of the first lens E1 to the sixth lens E6 are aspheric surfaces. Table 4 below gives higher order term coefficients $A_4$, $A_6$, $A_8$, $A_{10}$, $A_{12}$, $A_{14}$, $A_{16}$, $A_{18}$ and $A_{20}$ that may be used for each of the aspheric mirror surfaces S1-S12 in Embodiment 2.

TABLE 4

| Surface number | A4 | A6 | A8 | A10 | A12 |
|---|---|---|---|---|---|
| S1 | 1.6310E−03 | −3.6102E−05 | 6.7343E−07 | −1.2886E−08 | 2.4320E−10 |
| S2 | −8.6580E−03 | 1.1531E−03 | −1.0082E−04 | 8.2137E−06 | −4.8364E−07 |
| S3 | 1.1280E−02 | −2.8944E−03 | 3.2920E−04 | −2.7169E−05 | 1.6077E−06 |
| S4 | 1.4785E−02 | 7.9722E−04 | −8.5880E−04 | 7.3092E−05 | 2.7189E−06 |
| S5 | 3.9033E−03 | −2.0421E−04 | −9.5831E−06 | 3.8121E−06 | −2.5675E−06 |
| S6 | 2.1236E−02 | −1.6120E−02 | 1.2953E−02 | −7.2645E−03 | 2.4838E−03 |
| S7 | 3.5471E−02 | −2.7746E−02 | 2.1029E−02 | −1.1887E−02 | 4.1147E−03 |
| S8 | 1.7077E−03 | −1.2808E−03 | 1.6891E−04 | −1.9215E−04 | 7.1106E−05 |
| S9 | 1.8025E−03 | 1.6662E−03 | −1.0886E−03 | 3.4959E−06 | 6.2252E−05 |
| S10 | −4.1417E−03 | 4.0414E−03 | −1.2240E−03 | 1.5240E−04 | 6.0871E−06 |
| S11 | −1.9213E−03 | 8.2120E−05 | 2.0403E−05 | −3.7717E−06 | 3.2732E−07 |
| S12 | 4.5317E−04 | −3.1682E−04 | 3.3982E−05 | −2.0197E−06 | 6.3439E−08 |

| Surface number | A14 | A16 | A18 | A20 |
|---|---|---|---|---|
| S1 | −2.9666E−12 | 1.5908E−14 | 0.0000E+00 | 0.0000E+00 |
| S2 | 1.7109E−08 | −2.6017E−10 | 0.0000E+00 | 0.0000E+00 |
| S3 | −5.6292E−08 | 8.4000E−10 | 0.0000E+00 | 0.0000E+00 |
| S4 | −5.5173E−07 | 1.7109E−08 | 0.0000E+00 | 0.0000E+00 |
| S5 | 4.6755E−07 | −2.5350E−08 | 0.0000E+00 | 0.0000E+00 |
| S6 | −4.6174E−04 | 3.5434E−05 | 0.0000E+00 | 0.0000E+00 |
| S7 | −7.8149E−04 | 6.1111E−05 | 0.0000E+00 | 0.0000E+00 |
| S8 | −1.1467E−05 | 6.4091E−07 | 0.0000E+00 | 0.0000E+00 |
| S9 | −1.3321E−05 | 9.7383E−07 | 0.0000E+00 | 0.0000E+00 |
| S10 | −4.8355E−06 | 7.0271E−07 | −4.7098E−08 | 1.2526E−09 |
| S11 | −1.6943E−08 | 5.2398E−10 | −8.8887E−12 | 6.3371E−14 |
| S12 | −1.9342E−10 | −5.7314E−11 | 1.7531E−12 | −1.6843E−14 |

Figure 4A:
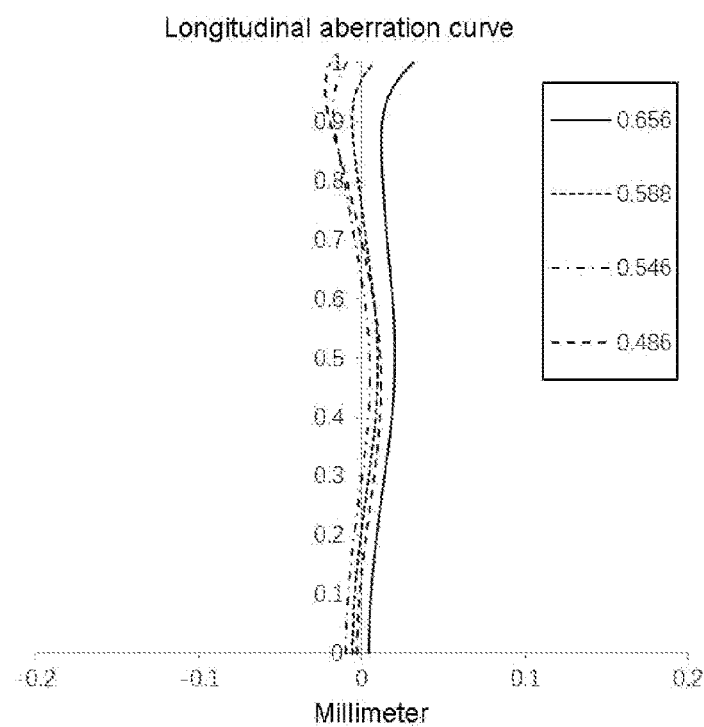
FIGS. 4A-4C show an optical imaging lens group, an astigmatism curve and a relative illuminance curve of the optical imaging lens assembly in Embodiment 2 respectively.
Figure 4B:
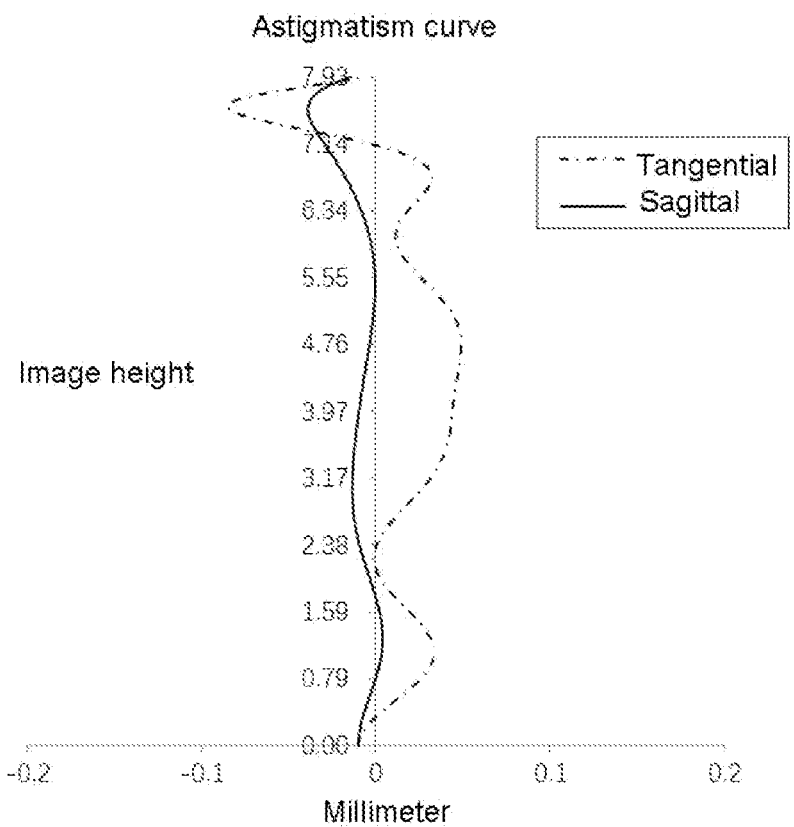
Figure 4C:
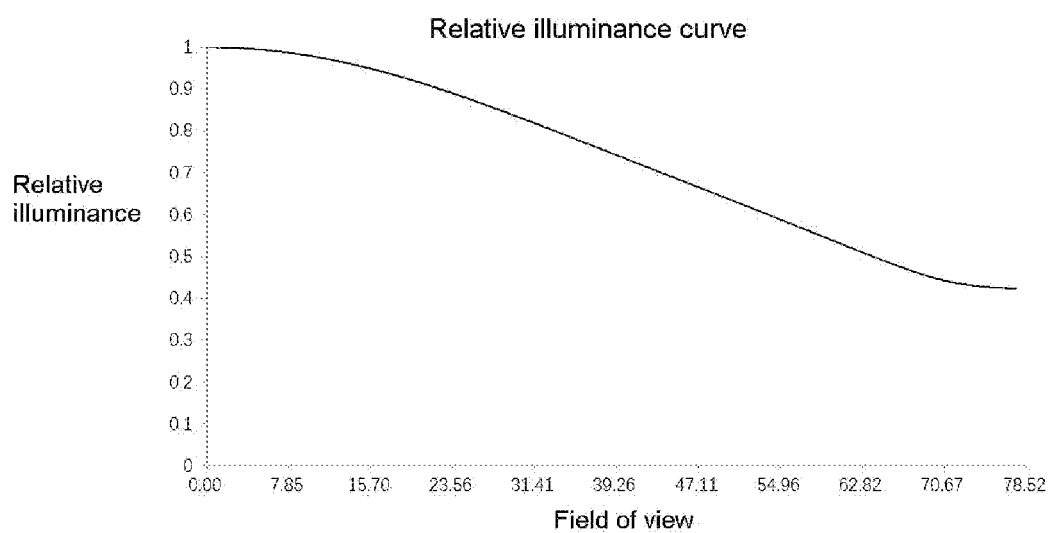

FIG. 4A shows an optical imaging lens group of the optical imaging lens assembly in Embodiment 2, which represents that a convergence focus of light rays of different wavelengths is deviated after the light rays pass through the lens. FIG. 4B shows an astigmatism curve of the optical imaging lens assembly of Embodiment 2, which represents a curvature of tangential image surface and a curvature of sagittal image surface. FIG. 4C shows a relative illuminance curve of the optical imaging lens assembly of Embodiment 2, which represents relative illuminance values corresponding to different fields of view. FIGS. 4A-4C show that the optical imaging lens assembly provided in Embodiment 2 is capable of achieving good imaging quality.

Embodiment 3

Figure 5:
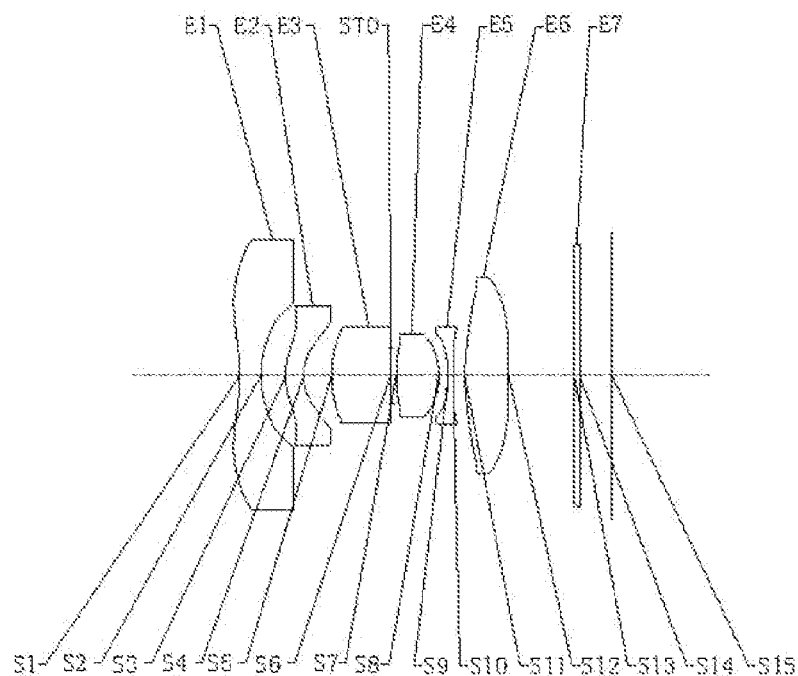
FIG. 5 shows a structural schematic diagram of an optical imaging lens assembly according to Embodiment 3 of the disclosure.

An optical imaging lens assembly according to Embodiment 3 of the disclosure is described below with reference to FIGS. 5-6C. FIG. 5 shows a structural schematic diagram of an optical imaging lens assembly according to Embodiment 3 of the disclosure.

As shown in FIG. 5, the optical imaging lens assembly sequentially includes from an object side to an image side along an optical axis: a first lens E1, a second lens E2, a third lens E3, a diaphragm STO, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a convex surface, and an image-side surface S12 thereof is a convex surface. The optical filter E7 has an object-side surface S13 and an image-side surface S14. Light from an object sequentially passes through each of the surfaces from S1 to S14 and is finally imaged on the imaging surface S15.

In this embodiment, the total effective focal length of the optical imaging lens assembly f=5.14 mm, the distance from the object-side surface S1 of the first lens E1 to the imaging surface S15 on the optical axis TTL=20.89 mm, the half of the diagonal length of the effective pixel region on the imaging surface S15 ImgH=7.93 mm, half of the maximum field of view of the optical imaging lens assembly Semi-FOV=68.25°, the f number of the optical imaging lens assembly Fno=3.00, and the relative illuminance corresponding to the maximum field of view of the optical imaging lens assembly RI=47%.

Table 5 shows a table of basic parameters of the optical imaging lens assembly of Embodiment 3, wherein the units of the curvature radius, thickness, and focal length are all millimeters (mm).

TABLE 5

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinity | Infinity | | | | |
| S1 | Aspheric | −10.1715 | 1.1925 | 1.55 | 56.1 | −5.88 | −8.4487 |
| S2 | Aspheric | 4.8907 | 1.3972 | | | | −0.2623 |
| S3 | Aspheric | 4.7255 | 1.0080 | 1.55 | 56.1 | −39.23 | −10.3087 |
| S4 | Aspheric | 3.5803 | 1.5707 | | | | −0.2636 |
| S5 | Aspheric | 8.2922 | 3.2862 | 1.83 | 41.0 | 7.80 | 1.4875 |
| S6 | Aspheric | −22.3678 | 0.0507 | | | | 99.0000 |
| STO | Spherical surface | Infinity | 0.2748 | | | | |
| S7 | Aspheric | 12.4672 | 2.3942 | 1.55 | 56.1 | 6.28 | −66.0617 |
| S8 | Aspheric | −4.4168 | 0.5508 | | | | 0.9821 |
| S9 | Aspheric | −5.7614 | 0.2612 | 1.68 | 19.2 | −7.21 | 3.1353 |
| S10 | Aspheric | 33.4262 | 0.6401 | | | | 74.5718 |
| S11 | Aspheric | 7.4170 | 2.4688 | 1.55 | 56.1 | 11.99 | −20.7038 |
| S12 | Aspheric | −49.4440 | 3.6789 | | | | −93.1006 |
| S13 | Spherical | Infinity | 0.3000 | 1.51 | 64.2 | | |
| S14 | Spherical | Infinity | 1.8146 | | | | |
| S15 | Spherical | Infinity | | | | | |

In Embodiment 3, both of the object-side surface and the image-side surface of any one of the first lens E1 to the sixth lens E6 are aspheric surfaces. Table 6 below gives higher order term coefficients $A_4$, $A_6$, $A_8$, $A_{10}$, $A_{12}$, $A_{14}$, $A_{16}$, $A_{18}$ and $A_{20}$ that may be used for each of the aspheric mirror surfaces S1-S12 in Embodiment 3.

TABLE 6

| Surface number | A4 | A6 | A8 | A10 | A12 |
|---|---|---|---|---|---|
| S1 | 1.5265E−03 | −2.6036E−05 | 2.9821E−07 | −1.7050E−09 | 2.4229E−11 |
| S2 | −7.2838E−03 | 7.9923E−04 | −6.5362E−05 | 7.7219E−06 | −7.2260E−07 |
| S3 | 1.0879E−02 | −1.9253E−03 | 7.8929E−05 | −1.3615E−06 | 4.7712E−07 |
| S4 | 1.8563E−02 | −1.0655E−03 | 2.0316E−04 | −3.1992E−04 | 7.5041E−05 |
| S5 | 5.0857E−03 | −1.8047E−04 | −9.7079E−05 | 2.4456E−05 | −4.9288E−06 |
| S6 | 1.4973E−02 | −6.5888E−03 | 7.1941E−03 | −5.7774E−03 | 2.6823E−03 |
| S7 | 2.2233E−02 | −8.3333E−03 | 4.3005E−03 | −2.1290E−03 | 6.2040E−04 |
| S8 | −3.7845E−04 | 2.8876E−03 | −3.8395E−03 | 1.7333E−03 | −4.2198E−04 |
| S9 | −6.4112E−03 | 1.6414E−02 | −1.2159E−02 | 4.4254E−03 | −9.2205E−04 |
| S10 | −1.4058E−02 | 1.6964E−02 | −9.8811E−03 | 3.5682E−03 | −8.2612E−04 |
| S11 | −4.6684E−03 | 7.3782E−04 | −6.9424E−05 | 7.3757E−06 | −8.0448E−07 |
| S12 | 1.6686E−03 | −6.4399E−04 | 8.1730E−05 | −6.6966E−06 | 3.7277E−07 |

| Surface number | A14 | A16 | A18 | A20 |
|---|---|---|---|---|
| S1 | −8.5872E−13 | 8.3636E−15 | 0.0000E+00 | 0.0000E+00 |
| S2 | 4.1242E−08 | −1.0047E−09 | 0.0000E+00 | 0.0000E+00 |
| S3 | −4.4410E−08 | 1.1310E−09 | 0.0000E+00 | 0.0000E+00 |
| S4 | −6.8051E−06 | 2.2083E−07 | 0.0000E+00 | 0.0000E+00 |
| S5 | 6.4205E−07 | −3.4445E−08 | 0.0000E+00 | 0.0000E+00 |
| S6 | −6.5027E−04 | 6.4173E−05 | 0.0000E+00 | 0.0000E+00 |
| S7 | −8.7680E−05 | 3.6884E−06 | 0.0000E+00 | 0.0000E+00 |
| S8 | 5.4398E−05 | −2.9194E−06 | 0.0000E+00 | 0.0000E+00 |
| S9 | 1.0368E−04 | −4.8197E−06 | 0.0000E+00 | 0.0000E+00 |
| S10 | 1.2257E−04 | −1.1242E−05 | 5.7914E−07 | −1.2786E−08 |
| S11 | 5.8143E−08 | −2.4148E−09 | 5.2940E−11 | −4.7811E−13 |
| S12 | −1.2894E−08 | 2.1263E−10 | 3.7281E−14 | −3.1200E−14 |

Figure 6A:
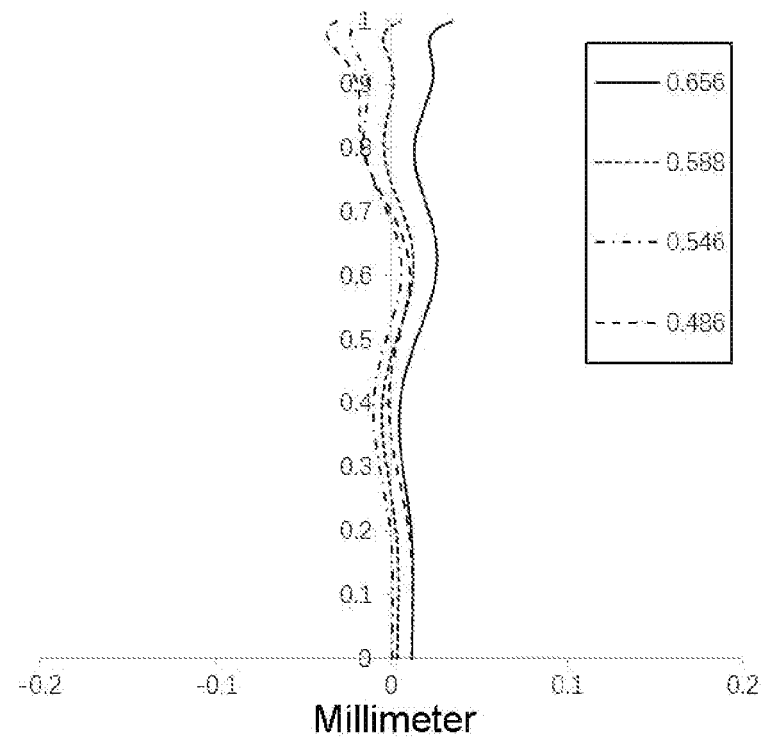
FIGS. 6A-6C show an optical imaging lens group, an astigmatism curve and a relative illuminance curve of the optical imaging lens assembly in Embodiment 3 respectively.
Figure 6B:
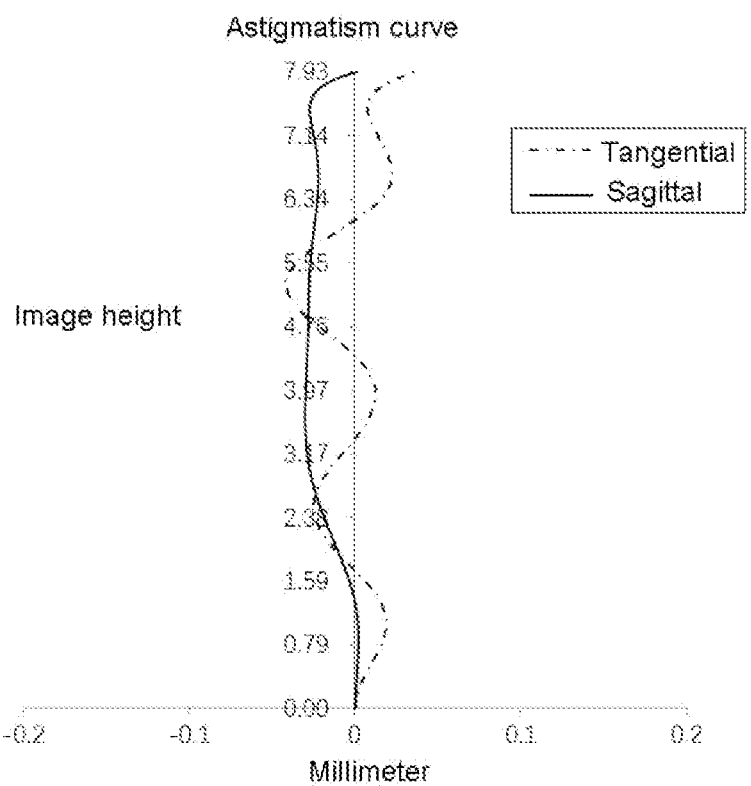
Figure 6C:
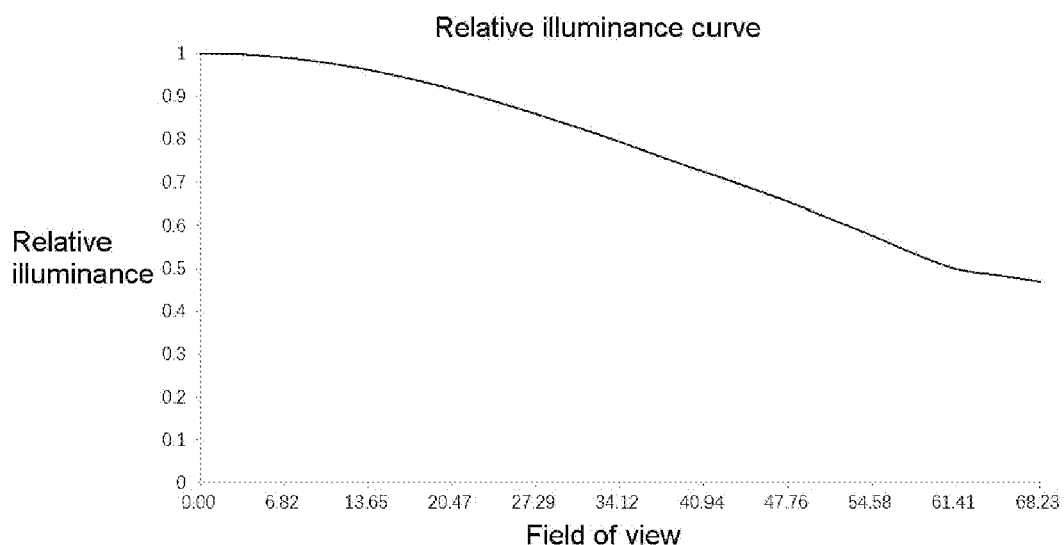

FIG. 6A shows an optical imaging lens group of the optical imaging lens assembly in Embodiment 3, which represents that a convergence focus of light rays of different wavelengths is deviated after the light rays pass through the lens. FIG. 6B shows an astigmatism curve of the optical imaging lens assembly of Embodiment 3, which represents a curvature of tangential image surface and a curvature of sagittal image surface. FIG. 6C shows a relative illuminance curve of the optical imaging lens assembly of Embodiment 3, which represents relative illuminance values corresponding to different fields of view. FIGS. 6A-6C show that the optical imaging lens assembly provided in Embodiment 3 is capable of achieving good imaging quality.

Embodiment 4

Figure 7:
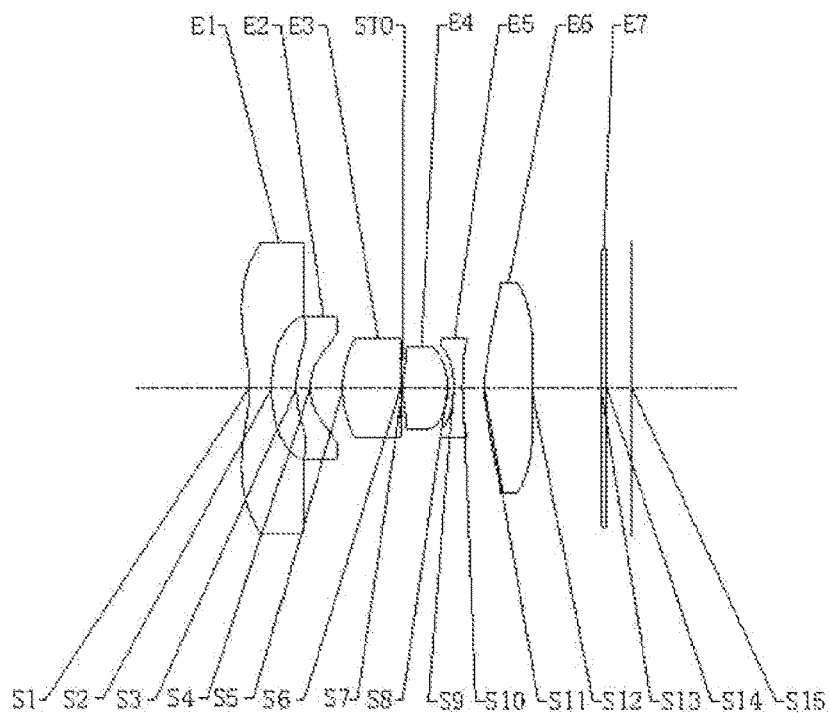
FIG. 7 shows a structural schematic diagram of an optical imaging lens assembly according to Embodiment 4 of the disclosure.

An optical imaging lens assembly according to Embodiment 4 of the disclosure is described below with reference to FIGS. 7-8C. FIG. 7 shows a structural schematic diagram of an optical imaging lens assembly according to Embodiment 4 of the disclosure.

As shown in FIG. 7, the optical imaging lens assembly sequentially includes from an object side to an image side along an optical axis: a first lens E1, a second lens E2, a third lens E3, a diaphragm STO, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a convex surface, and an image-side surface S12 thereof is a concave surface. The optical filter E7 has an object-side surface S13 and an image-side surface S14. Light from an object sequentially passes through each of the surfaces from S1 to S14 and is finally imaged on the imaging surface S15.

In this embodiment, the total effective focal length of the optical imaging lens assembly f=5.05 mm, the distance from the object-side surface S1 of the first lens E1 to the imaging surface S15 on the optical axis TTL=20.64 mm, the half of the diagonal length of the effective pixel region on the imaging surface S15 ImgH=7.93 mm, half of the maximum field of view of the optical imaging lens assembly Semi-FOV=74.43°, the f number of the optical imaging lens assembly Fno=2.99, and the relative illuminance corresponding to the maximum field of view of the optical imaging lens assembly RI=49%.

Table 7 shows a table of basic parameters of the optical imaging lens assembly of Embodiment 4, wherein the units of the curvature radius, thickness, and focal length are all millimeters (mm).

TABLE 7

| Surface number | Surface type | Curvature radius | Thickness/ distance | Refractive index | Abbe number | Focal length | Conic coefficient |
|---|---|---|---|---|---|---|---|
| OBJ | Spherical | Infinity | Infinity | | | | |
| S1 | Aspheric | −8.6382 | 1.2081 | 1.55 | 56.1 | −6.34 | −8.6601 |
| S2 | Aspheric | 6.0759 | 1.3035 | | | | 0.9946 |
| S3 | Aspheric | 5.4044 | 0.7693 | 1.55 | 56.1 | −21.76 | −12.5639 |
| S4 | Aspheric | 3.5287 | 1.7452 | | | | −0.4681 |
| S5 | Aspheric | 7.0833 | 3.1357 | 1.75 | 34.8 | 7.71 | 1.2883 |
| S6 | Aspheric | −26.4569 | 0.0311 | | | | 68.2519 |
| STO | Spherical surface | Infinity | 0.0919 | | | | |
| S7 | Aspheric | 10.2522 | 2.4201 | 1.55 | 56.1 | 5.75 | −91.8624 |
| S8 | Aspheric | −4.1566 | 0.3159 | | | | 1.2396 |
| S9 | Aspheric | −5.5482 | 0.4953 | 1.68 | 19.2 | −6.79 | 2.3367 |
| S10 | Aspheric | 28.4895 | 1.1712 | | | | 90.9983 |
| S11 | Aspheric | 6.4841 | 2.5523 | 1.55 | 56.1 | 12.24 | −11.5787 |
| S12 | Aspheric | 183.4223 | 3.7207 | | | | −20.8752 |
| S13 | Spherical | Infinity | 0.3000 | 1.51 | 64.2 | | |
| S14 | Spherical | Infinity | 1.3818 | | | | |
| S15 | Spherical | Infinity | | | | | |

In Embodiment 4, both of the object-side surface and the image-side surface of any one of the first lens E1 to the sixth lens E6 are aspheric surfaces. Table 8 below gives higher order term coefficients $A_4$, $A_6$, $A_8$, $A_{10}$, $A_{12}$, $A_{14}$, $A_{16}$, $A_{18}$ and $A_{20}$ that may be used for each of the aspheric mirror surfaces S1-S12 in Embodiment 4.

TABLE 8

| Surface number | A4 | A6 | A8 | A10 | A12 |
|---|---|---|---|---|---|
| S1 | 1.6495E−03 | −3.8289E−05 | 6.2502E−07 | −4.9887E−09 | −1.0683E−11 |
| S2 | −1.1860E−02 | 2.1876E−03 | −2.4709E−04 | 2.0221E−05 | −1.1211E−06 |
| S3 | −3.6441E−03 | 5.0212E−03 | −1.3779E−03 | 1.6487E−04 | −1.0377E−05 |
| S4 | 6.1948E−03 | 7.7775E−03 | −2.3816E−03 | 3.4275E−05 | 5.4825E−05 |
| S5 | 3.9117E−03 | −2.2084E−04 | 6.3049E−05 | −6.2904E−05 | 1.5235E−05 |
| S6 | 2.1563E−02 | −1.7667E−02 | 1.5244E−02 | −9.8971E−03 | 4.0570E−03 |
| S7 | 3.6271E−02 | −2.7480E−02 | 1.8977E−02 | −1.0185E−02 | 3.4306E−03 |
| S8 | 2.2128E−03 | −7.0520E−04 | −8.4535E−04 | 1.3524E−04 | 2.8205E−05 |
| S9 | 1.1539E−03 | 3.1154E−03 | −1.3329E−03 | −3.0246E−04 | 1.9170E−04 |
| S10 | −6.0495E−03 | 5.7079E−03 | −1.6980E−03 | 2.2107E−04 | −4.5962E−06 |
| S11 | −1.6546E−03 | −2.0836E−04 | 7.5000E−05 | −8.7708E−06 | 5.6918E−07 |
| S12 | 3.0073E−03 | −8.1655E−04 | 8.8358E−05 | −6.3577E−06 | 3.3357E−07 |

TABLE 8-continued

| Surface number | A14 | A16 | A18 | A20 |
|---|---|---|---|---|
| S1 | 5.1016E−13 | −2.4605E−15 | 0.0000E+00 | 0.0000E+00 |
| S2 | 3.8360E−08 | −5.9681E−10 | 0.0000E+00 | 0.0000E+00 |
| S3 | 3.3977E−07 | −4.5892E−09 | 0.0000E+00 | 0.0000E+00 |
| S4 | −6.9368E−06 | 2.6907E−07 | 0.0000E+00 | 0.0000E+00 |
| S5 | −1.4788E−06 | 5.5816E−08 | 0.0000E+00 | 0.0000E+00 |
| S6 | −9.1463E−04 | 8.6056E−05 | 0.0000E+00 | 0.0000E+00 |
| S7 | −6.3574E−04 | 4.8145E−05 | 0.0000E+00 | 0.0000E+00 |
| S8 | −7.9046E−06 | 4.2627E−07 | 0.0000E+00 | 0.0000E+00 |
| S9 | −2.9714E−05 | 1.5472E−06 | 0.0000E+00 | 0.0000E+00 |
| S10 | −1.5916E−06 | 6.4429E−08 | 1.1696E−08 | −8.0357E−10 |
| S11 | −2.2343E−08 | 5.2488E−10 | −6.7647E−12 | 3.6699E−14 |
| S12 | −1.2659E−08 | 3.2337E−10 | −4.8867E−12 | 3.2595E−14 |

Figure 8A:
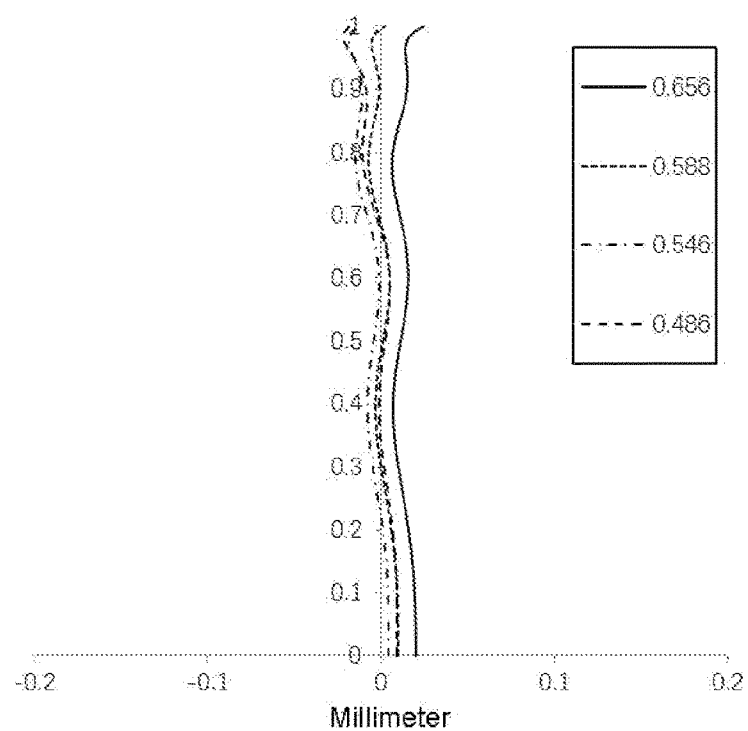
FIGS. 8A-8C show an optical imaging lens group, an astigmatism curve and a relative illuminance curve of the optical imaging lens assembly in Embodiment 4 respectively.
Figure 8B:
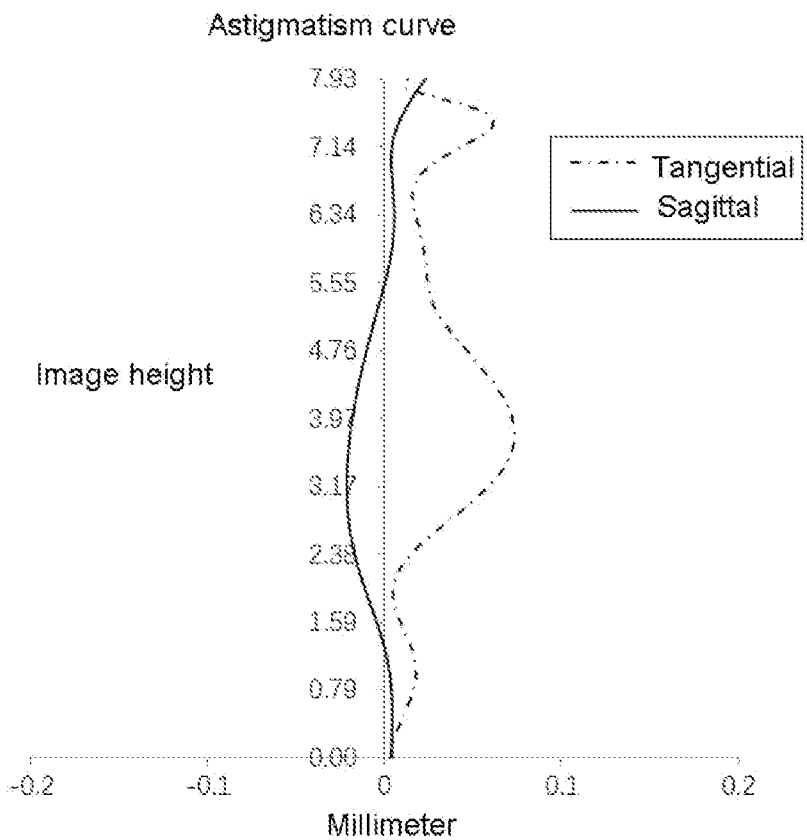
Figure 8C:
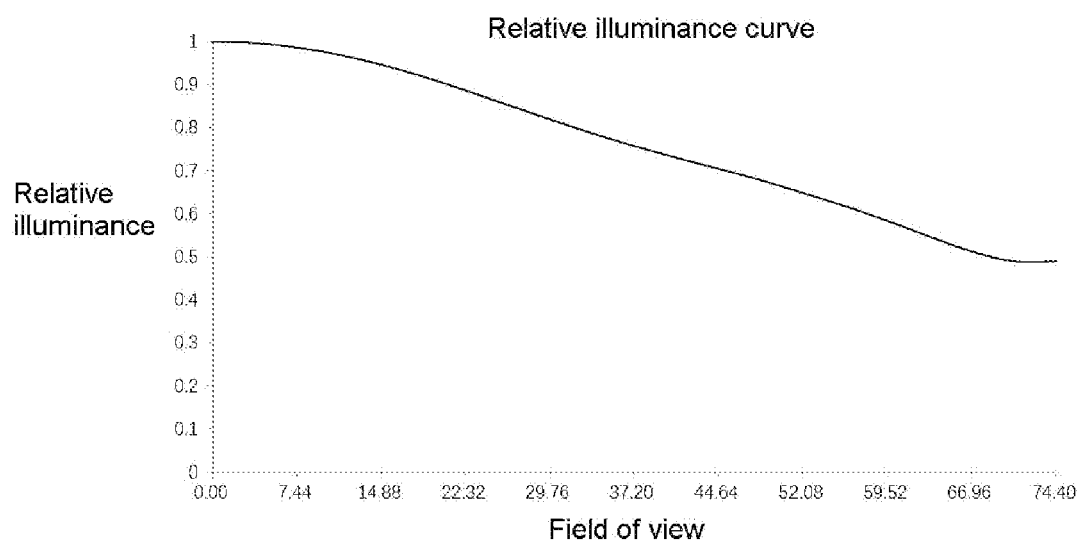

FIG. 8A shows an optical imaging lens group of the optical imaging lens assembly in Embodiment 4, which represents that a convergence focus of light rays of different wavelengths is deviated after the light rays pass through the lens. FIG. 8B shows an astigmatism curve of the optical imaging lens assembly of Embodiment 4, which represents a curvature of tangential image surface and a curvature of sagittal image surface. FIG. 8C shows a relative illuminance curve of the optical imaging lens assembly of Embodiment 4, which represents relative illuminance values corresponding to different fields of view. FIGS. 8A-8C show that the optical imaging lens assembly provided in Embodiment 4 is capable of achieving good imaging quality.

Embodiment 5

Figure 9:
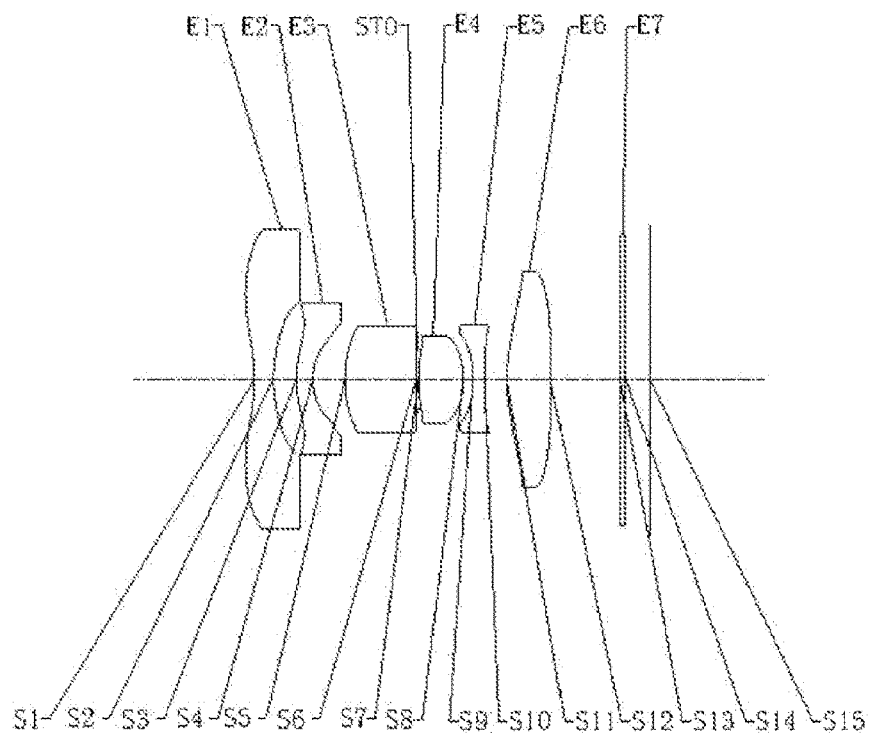
FIG. 9 shows a structural schematic diagram of an optical imaging lens assembly according to Embodiment 5 of the disclosure.

An optical imaging lens assembly according to Embodiment 5 of the disclosure is described below with reference to FIGS. 9-10C. FIG. 9 shows a structural schematic diagram of an optical imaging lens assembly according to Embodiment 5 of the disclosure.

As shown in FIG. 9, the optical imaging lens assembly sequentially includes from an object side to an image side along an optical axis: a first lens E1, a second lens E2, a third lens E3, a diaphragm STO, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a convex surface, and an image-side surface S12 thereof is a concave surface. The optical filter E7 has an object-side surface S13 and an image-side surface S14. Light from an object sequentially passes through each of the surfaces from S1 to S14 and is finally imaged on the imaging surface S15.

In this embodiment, the total effective focal length of the optical imaging lens assembly f=5.07 mm, the distance from the object-side surface S1 of the first lens E1 to the imaging surface S15 on the optical axis TTL=20.39 mm, the half of the diagonal length of the effective pixel region on the imaging surface S15 ImgH=7.93 mm, half of the maximum field of view of the optical imaging lens assembly Semi-FOV=77.52°, the f number of the optical imaging lens assembly Fno=2.99, and the relative illuminance corresponding to the maximum field of view of the optical imaging lens assembly RI=42%.

Table 9 shows a table of basic parameters of the optical imaging lens assembly of Embodiment 5, wherein the units of the curvature radius, thickness, and focal length are all millimeters (mm).

TABLE 9

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinity | Infinity | | | | |
| S1 | Aspheric | −8.3029 | 0.9752 | 1.55 | 56.1 | −6.28 | −6.9104 |
| S2 | Aspheric | 6.0858 | 1.1661 | | | | −0.2939 |
| S3 | Aspheric | 5.7169 | 0.8480 | 1.55 | 56.1 | −19.91 | −25.5005 |
| S4 | Aspheric | 3.5515 | 1.6512 | | | | −0.3215 |
| S5 | Aspheric | 7.1863 | 3.7000 | 1.83 | 41.0 | 7.13 | 0.5380 |
| S6 | Aspheric | −23.3821 | 0.0435 | | | | 83.8991 |
| STO | Spherical surface | Infinity | 0.0665 | | | | |
| S7 | Aspheric | 10.8398 | 2.3272 | 1.55 | 56.1 | 5.94 | −82.2900 |
| S8 | Aspheric | −4.2834 | 0.4946 | | | | 1.2452 |
| S9 | Aspheric | −5.6665 | 0.5937 | 1.68 | 19.2 | −6.93 | 2.2111 |
| S10 | Aspheric | 29.0601 | 1.1487 | | | | 88.1713 |
| S11 | Aspheric | 6.6421 | 2.2390 | 1.55 | 56.1 | 12.82 | −14.2025 |
| S12 | Aspheric | 112.2313 | 3.5885 | | | | 97.1949 |

TABLE 9-continued

| Surface number | Surface type | Curvature radius | Thickness/ distance | Material Refractive index | Abbe number | Focal length | Conic coefficient |
|---|---|---|---|---|---|---|---|
| S13 | Spherical | Infinity | 0.3000 | 1.51 | 64.2 | | |
| S14 | Spherical | Infinity | 1.2496 | | | | |
| S15 | Spherical | Infinity | | | | | |

In Embodiment 5, both of the object-side surface and the image-side surface of any one of the first lens E1 to the sixth lens E6 are aspheric surfaces. Table 10 below gives higher order term coefficients $A_4$, $A_6$, $A_8$, $A_{10}$, $A_{12}$, $A_{14}$, $A_{16}$, $A_{18}$ and $A_{20}$ that may be used for each of the aspheric mirror surfaces S1-S12 in Embodiment 5.

TABLE 10

| Surface number | A4 | A6 | A8 | A10 | A12 |
|---|---|---|---|---|---|
| S1 | 1.6310E−03 | −3.6102E−05 | 6.7343E−07 | −1.2886E−08 | 2.4320E−10 |
| S2 | −8.6580E−03 | 1.1531E−03 | −1.0082E−04 | 8.2137E−06 | −4.8364E−07 |
| S3 | 1.1280E−02 | −2.8944E−03 | 3.2920E−04 | −2.7169E−05 | 1.6077E−06 |
| S4 | 1.4785E−02 | 7.9722E−04 | −8.5880E−04 | 7.3092E−05 | 2.7189E−06 |
| S5 | 3.9033E−03 | −2.0421E−04 | −9.5831E−06 | 3.8121E−06 | −2.5675E−06 |
| S6 | 2.1236E−02 | −1.6120E−02 | 1.2953E−02 | −7.2645E−03 | 2.4838E−03 |
| S7 | 3.5471E−02 | −2.7746E−02 | 2.1029E−02 | −1.1887E−02 | 4.1147E−03 |
| S8 | 1.7077E−03 | −1.2808E−03 | 1.6891E−04 | −1.9215E−04 | 7.1106E−05 |
| S9 | 1.8025E−03 | 1.6662E−03 | −1.0886E−03 | 3.4959E−06 | 6.2252E−05 |
| S10 | −4.1417E−03 | 4.0414E−03 | −1.2240E−03 | 1.5240E−04 | 6.0871E−06 |
| S11 | −1.9213E−03 | 8.2120E−05 | 2.0403E−05 | −3.7717E−06 | 3.2732E−07 |
| S12 | 4.5317E−04 | −3.1682E−04 | 3.3982E−05 | −2.0197E−06 | 6.3439E−08 |

| Surface number | A14 | A16 | A18 | A20 |
|---|---|---|---|---|
| S1 | −2.9666E−12 | 1.5908E−14 | 0.0000E+00 | 0.0000E+00 |
| S2 | 1.7109E−08 | −2.6017E−10 | 0.0000E+00 | 0.0000E+00 |
| S3 | −5.6292E−08 | 8.4000E−10 | 0.0000E+00 | 0.0000E+00 |
| S4 | −5.5173E−07 | 1.7109E−08 | 0.0000E+00 | 0.0000E+00 |
| S5 | 4.6755E−07 | −2.5350E−08 | 0.0000E+00 | 0.0000E+00 |
| S6 | −4.6174E−04 | 3.5434E−05 | 0.0000E+00 | 0.0000E+00 |
| S7 | −7.8149E−04 | 6.1111E−05 | 0.0000E+00 | 0.0000E+00 |
| S8 | −1.1467E−05 | 6.4091E−07 | 0.0000E+00 | 0.0000E+00 |
| S9 | −1.3321E−05 | 9.7383E−07 | 0.0000E+00 | 0.0000E+00 |
| S10 | −4.8355E−06 | 7.0271E−07 | −4.7098E−08 | 1.2526E−09 |
| S11 | −1.6943E−08 | 5.2398E−10 | −8.8887E−12 | 6.3371E−14 |
| S12 | −1.9342E−10 | −5.7314E−11 | 1.7531E−12 | −1.6843E−14 |

Figure 10A:
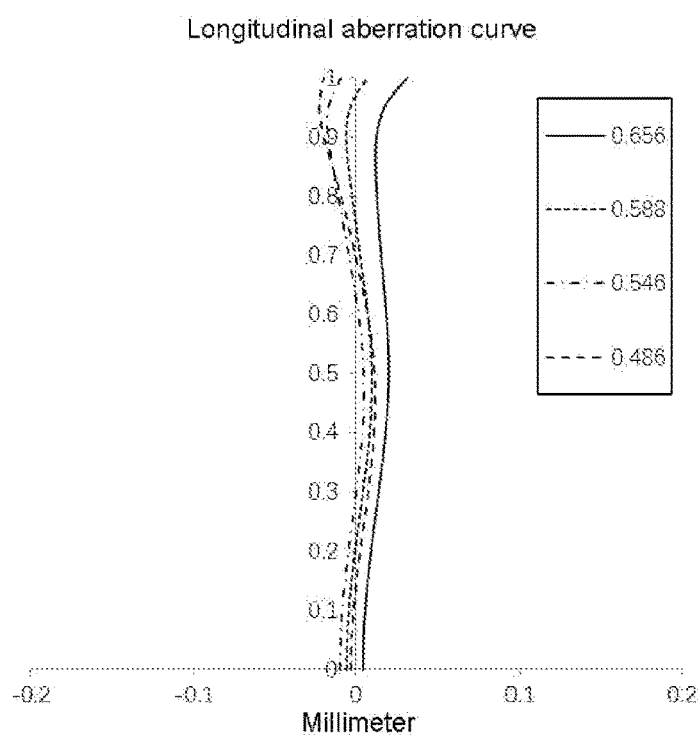
FIGS. 10A-10C show an optical imaging lens group, an astigmatism curve and a relative illuminance curve of the optical imaging lens assembly in Embodiment 5 respectively.
Figure 10B:
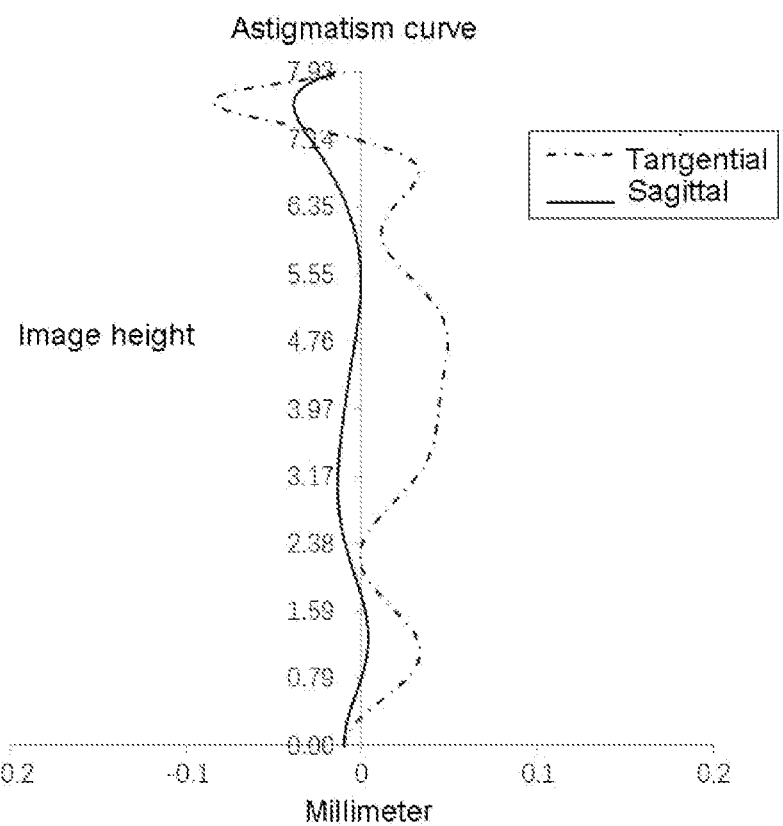
Figure 10C:
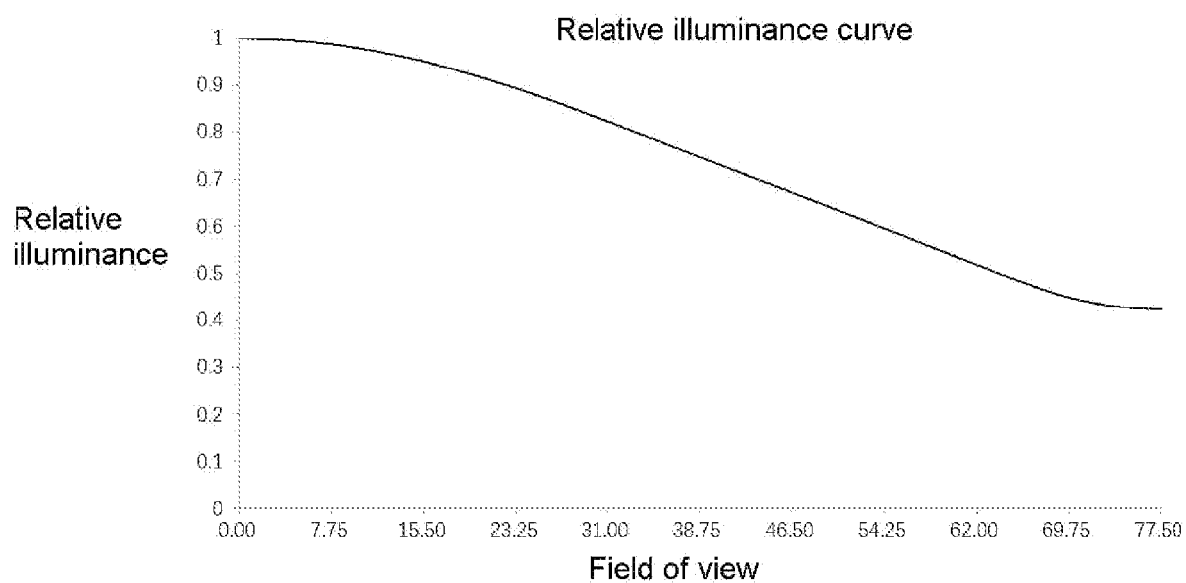

FIG. 10A shows an optical imaging lens group of the optical imaging lens assembly in Embodiment 5, which represents that a convergence focus of light rays of different wavelengths is deviated after the light rays pass through the lens. FIG. 10B shows an astigmatism curve of the optical imaging lens assembly of Embodiment 5, which represents a curvature of tangential image surface and a curvature of sagittal image surface. FIG. 10C shows a relative illuminance curve of the optical imaging lens assembly of Embodiment 5, which represents relative illuminance values corresponding to different fields of view. FIGS. 10A-10C show that the optical imaging lens assembly provided in Embodiment 5 is capable of achieving good imaging quality.

Embodiment 6

Figure 11:
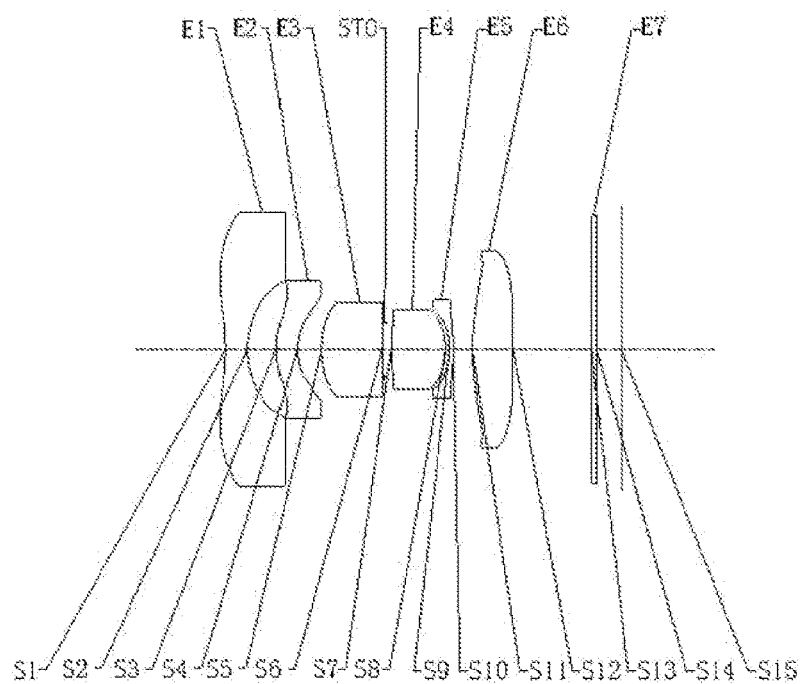
FIG. 11 shows a structural schematic diagram of an optical imaging lens assembly according to Embodiment 6 of the disclosure.

An optical imaging lens assembly according to Embodiment 6 of the disclosure is described below with reference to FIGS. 11-12D. FIG. 11 shows a structural schematic diagram of an optical imaging lens assembly according to Embodiment 6 of the disclosure.

As shown in FIG. 11, the optical imaging lens assembly sequentially includes from an object side to an image side along an optical axis: a first lens E1, a second lens E2, a third lens E3, a diaphragm STO, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a positive refractive power, an object-side surface S11 thereof is a convex surface, and an image-side surface S12 thereof is a convex surface. The optical filter E7 has an object-side surface S13 and an image-side surface S14. Light from an object sequentially passes through each of the surfaces from S1 to S14 and is finally imaged on the imaging surface S15.

In this embodiment, the total effective focal length of the optical imaging lens assembly f=5.56 mm, the distance from the object-side surface S1 of the first lens E1 to the imaging surface S15 on the optical axis TTL=22.20 mm, the half of the diagonal length of the effective pixel region on the imaging surface S15 ImgH=7.94 mm, half of the maximum field of view of the optical imaging lens assembly Semi-FOV=65.84°, the f number of the optical imaging lens assembly Fno=2.99, and the relative illuminance corresponding to the maximum field of view of the optical imaging lens assembly RI=54%.

Table 11 shows a table of basic parameters of the optical imaging lens assembly of Embodiment 6, wherein the units of the curvature radius, thickness, and focal length are all millimeters (mm).

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinity | Infinity | | | | |
| S1 | Aspheric | −11.3003 | 1.2181 | 1.55 | 56.1 | −5.64 | −5.8622 |
| S2 | Aspheric | 4.3977 | 1.5986 | | | | −0.9013 |
| S3 | Aspheric | 4.6072 | 1.2044 | 1.55 | 56.1 | −60.96 | −9.9002 |
| S4 | Aspheric | 3.6736 | 1.3542 | | | | −0.4031 |
| S5 | Aspheric | 6.0786 | 3.4152 | 1.83 | 41.0 | 6.95 | 0.7824 |
| S6 | Aspheric | −61.4700 | 0.1397 | | | | −99.0000 |
| STO | Spherical surface | Infinity | 0.3668 | | | | |
| S7 | Aspheric | 24.7394 | 3.0649 | 1.55 | 56.1 | 6.17 | 75.7267 |
| S8 | Aspheric | −3.7365 | 0.2119 | | | | 0.6078 |
| S9 | Aspheric | −4.1320 | 0.2000 | 1.68 | 19.2 | −8.72 | 1.7407 |
| S10 | Aspheric | −13.9327 | 1.0954 | | | | −51.5467 |
| S11 | Aspheric | 10.5378 | 2.2685 | 1.55 | 56.1 | 18.95 | −21.8804 |
| S12 | Aspheric | −555.0012 | 4.3784 | | | | −99.0000 |
| S13 | Spherical | Infinity | 0.3000 | 1.51 | 64.2 | | |
| S14 | Spherical | Infinity | 1.3876 | | | | |
| S15 | Spherical | Infinity | | | | | |

In Embodiment 6, both of the object-side surface and the image-side surface of any one of the first lens E1 to the sixth lens E6 are aspheric surfaces. Table 12 below gives higher order term coefficients $A_4$, $A_6$, $A_8$, $A_{10}$, $A_{12}$, $A_{14}$, $A_{16}$, $A_{18}$ and $A_{20}$ that may be used for each of the aspheric mirror surfaces S1-S12 in Embodiment 6.

TABLE 12

| Surface number | A4 | A6 | A8 | A10 | A12 |
|---|---|---|---|---|---|
| S1 | 1.6310E−03 | −3.6102E−05 | 6.7343E−07 | −1.2886E−08 | 2.4320E−10 |
| S2 | −8.6580E−03 | 1.1531E−03 | −1.0082E−04 | 8.2137E−06 | −4.8364E−07 |
| S3 | 1.1280E−02 | −2.8944E−03 | 3.2920E−04 | −2.7169E−05 | 1.6077E−06 |
| S4 | 1.4785E−02 | 7.9722E−04 | −8.5880E−04 | 7.3092E−05 | 2.7189E−06 |
| S5 | 3.9033E−03 | −2.0421E−04 | −9.5831E−06 | 3.8121E−06 | −2.5675E−06 |
| S6 | 2.1236E−02 | −1.6120E−02 | 1.2953E−02 | −7.2645E−03 | 2.4838E−03 |
| S7 | 3.5471E−02 | −2.7746E−02 | 2.1029E−02 | −1.1887E−02 | 4.1147E−03 |
| S8 | 1.7077E−03 | −1.2808E−03 | 1.6891E−04 | −1.9215E−04 | 7.1106E−05 |
| S9 | 1.8025E−03 | 1.6662E−03 | −1.0886E−03 | 3.4959E−06 | 6.2252E−05 |
| S10 | −4.1417E−03 | 4.0414E−03 | −1.2240E−03 | 1.5240E−04 | 6.0871E−06 |
| S11 | −1.9213E−03 | 8.2120E−05 | 2.0403E−05 | −3.7717E−06 | 3.2732E−07 |
| S12 | 4.5317E−04 | −3.1682E−04 | 3.3982E−05 | −2.0197E−06 | 6.3439E−08 |

| Surface number | A14 | A16 | A18 | A20 |
|---|---|---|---|---|
| S1 | −2.9666E−12 | 1.5908E−14 | 0.0000E+00 | 0.0000E+00 |
| S2 | 1.7109E−08 | −2.6017E−10 | 0.0000E+00 | 0.0000E+00 |
| S3 | −5.6292E−08 | 8.4000E−10 | 0.0000E+00 | 0.0000E+00 |
| S4 | −5.5173E−07 | 1.7109E−08 | 0.0000E+00 | 0.0000E+00 |
| S5 | 4.6755E−07 | −2.5350E−08 | 0.0000E+00 | 0.0000E+00 |
| S6 | −4.6174E−04 | 3.5434E−05 | 0.0000E+00 | 0.0000E+00 |
| S7 | −7.8149E−04 | 6.1111E−05 | 0.0000E+00 | 0.0000E+00 |
| S8 | −1.1467E−05 | 6.4091E−07 | 0.0000E+00 | 0.0000E+00 |
| S9 | −1.3321E−05 | 9.7383E−07 | 0.0000E+00 | 0.0000E+00 |
| S10 | −4.8355E−06 | 7.0271E−07 | −4.7098E−08 | 1.2526E−09 |
| S11 | −1.6943E−08 | 5.2398E−10 | −8.8887E−12 | 6.3371E−14 |
| S12 | −1.9342E−10 | −5.7314E−11 | 1.7531E−12 | −1.6843E−14 |

Figure 12A:
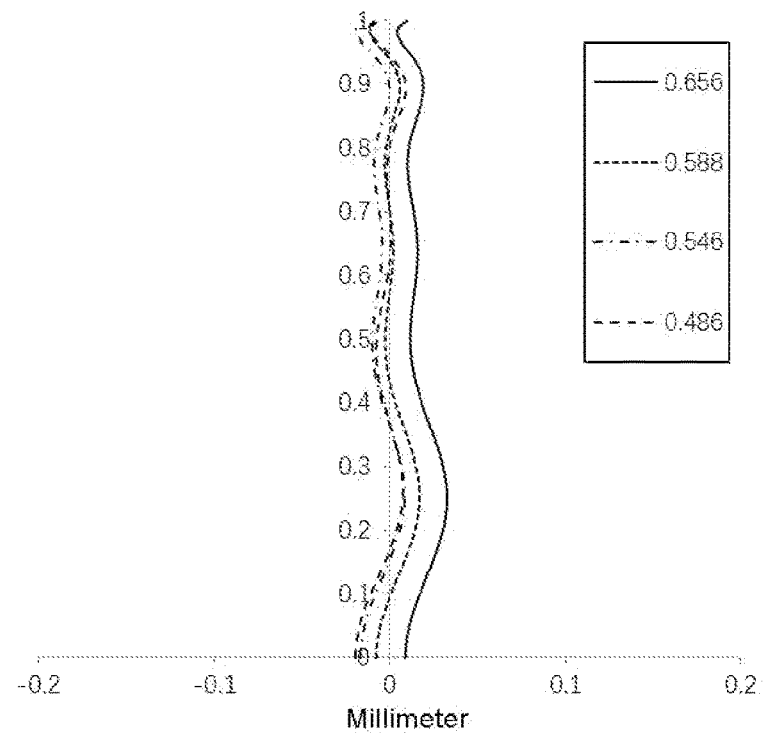
FIGS. 12A-12C show an optical imaging lens group, an astigmatism curve and a relative illuminance curve of the optical imaging lens assembly in Embodiment 6 respectively.
Figure 12B:
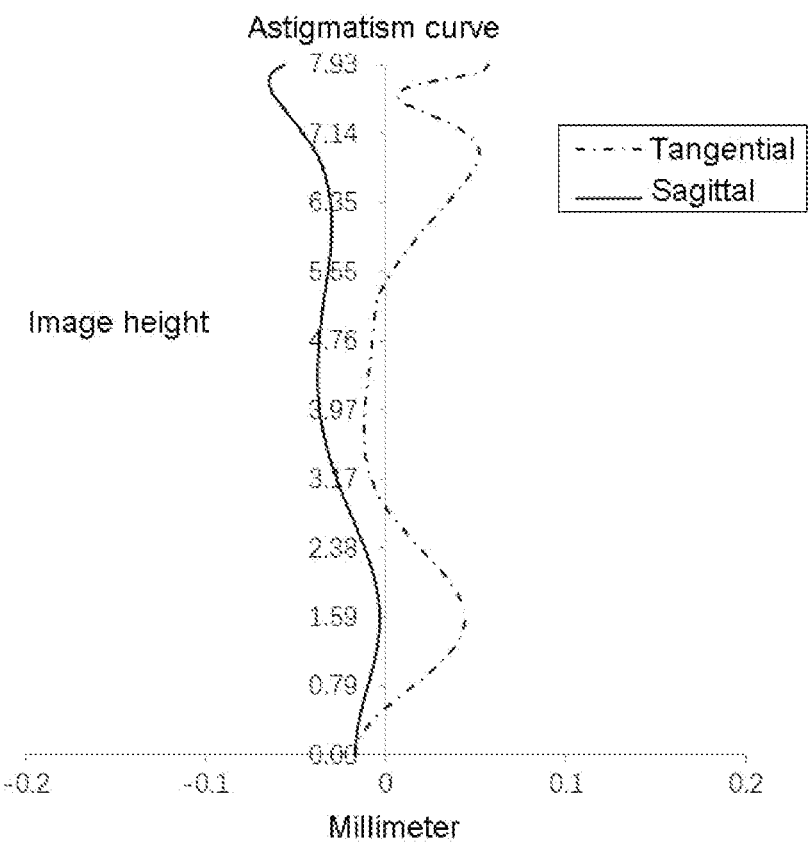
Figure 12C:
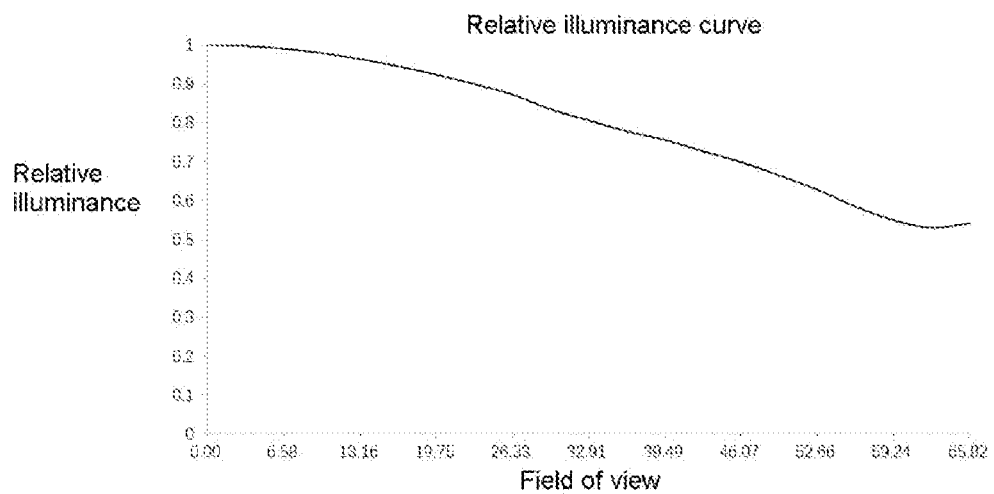

FIG. 12A shows an optical imaging lens group of the optical imaging lens assembly in Embodiment 6, which represents that a convergence focus of light rays of different wavelengths is deviated after the light rays pass through the lens. FIG. 12B shows an astigmatism curve of the optical imaging lens assembly of Embodiment 6, which represents a curvature of tangential image surface and a curvature of sagittal image surface. FIG. 12C shows a relative illuminance curve of the optical imaging lens assembly of Embodiment 6, which represents relative illuminance values corresponding to different fields of view. FIGS. 12A-12C show that the optical imaging lens assembly provided in Embodiment 6 is capable of achieving good imaging quality.

Embodiment 7

Figure 13:
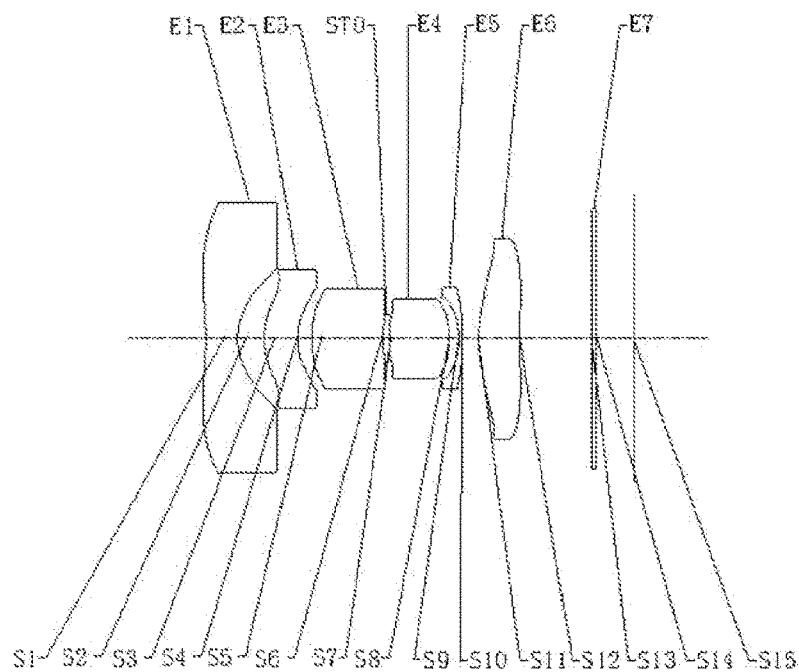
FIG. 13 shows a structural schematic diagram of an optical imaging lens assembly according to Embodiment 7 of the disclosure.

An optical imaging lens assembly according to Embodiment 7 of the disclosure is described below with reference to FIGS. 13-14D. FIG. 13 shows a structural schematic diagram of an optical imaging lens assembly according to Embodiment 7 of the disclosure.

As shown in FIG. 13, the optical imaging lens assembly sequentially includes from an object side to an image side along an optical axis: a first lens E1, a second lens E2, a third lens E3, a diaphragm STO, a fourth lens E4, a fifth lens E5, a sixth lens E6, an optical filter E7 and an imaging surface S15.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a positive refractive power, an object-side surface S11 thereof is a convex surface, and an image-side surface S12 thereof is a concave surface. The optical filter E7 has an object-side surface S13 and an image-side surface S14. Light from an object sequentially passes through each of the surfaces from S1 to S14 and is finally imaged on the imaging surface S15.

In this embodiment, the total effective focal length of the optical imaging lens assembly f=6.10 mm, the distance from the object-side surface S1 of the first lens E1 to the imaging surface S15 on the optical axis TTL=23.97 mm, the half of the diagonal length of the effective pixel region on the imaging surface S15 ImgH=7.93 mm, half of the maximum field of view of the optical imaging lens assembly Semi-FOV=55.93°, the f number of the optical imaging lens assembly Fno=2.99, and the relative illuminance corresponding to the maximum field of view of the optical imaging lens assembly RI=59%.

Table 13 shows a table of basic parameters of the optical imaging lens assembly of Embodiment 7, wherein the units of the curvature radius, thickness, and focal length are all millimeters (mm).

TABLE 13

| Surface number | Surface type | Curvature radius | Thickness/ distance | Refractive index | Abbe number | Focal length | Conic coefficient |
|---|---|---|---|---|---|---|---|
| OBJ | Spherical | Infinity | Infinity | | | | |
| S1 | Aspheric | −16.2011 | 1.7861 | 1.55 | 56.1 | −5.11 | −4.3306 |
| S2 | Aspheric | 3.5027 | 1.4946 | | | | −0.5525 |
| S3 | Aspheric | 3.9457 | 1.8490 | 1.55 | 56.1 | 40.64 | −5.5409 |
| S4 | Aspheric | 4.0036 | 0.8067 | | | | −0.5266 |
| S5 | Aspheric | 6.8963 | 4.0138 | 1.83 | 41.0 | 8.41 | −1.0933 |
| S6 | Aspheric | −794.9462 | 0.1426 | | | | −99.0000 |
| STO | Spherical | Infinity | 0.2000 | | | | |
| S7 | Aspheric | 14.4675 | 3.3540 | 1.55 | 56.1 | 6.95 | −13.3231 |
| S8 | Aspheric | −4.7302 | 0.5217 | | | | 0.0767 |
| S9 | Aspheric | −5.0462 | 0.2000 | 1.68 | 19.2 | −9.06 | 3.1549 |
| S10 | Aspheric | −28.4810 | 0.9295 | | | | 86.0171 |
| S11 | Aspheric | 6.0756 | 2.3011 | 1.55 | 56.1 | 12.68 | −14.6601 |
| S12 | Aspheric | 42.6878 | 3.9982 | | | | 7.6880 |
| S13 | Spherical | Infinity | 0.3000 | 1.51 | 64.2 | | |
| S14 | Spherical | Infinity | 2.0746 | | | | |
| S15 | Spherical | Infinity | | | | | |

In Embodiment 7, both of the object-side surface and the image-side surface of any one of the first lens E1 to the sixth lens E6 are aspheric surfaces. Table 14 below gives higher order term coefficients $A_4$, $A_6$, $A_8$, $A_{10}$, $A_{12}$, $A_{14}$, $A_{16}$, $A_{18}$ and $A_{20}$ that may be used for each of the aspheric mirror surfaces S1-S12 in Embodiment 7.

TABLE 14

| Surface number | A4 | A6 | A8 | A10 | A12 |
|---|---|---|---|---|---|
| S1 | 2.1603E−03 | −9.6961E−05 | 3.6282E−06 | −9.2922E−08 | 1.5074E−09 |
| S2 | −4.1259E−03 | 5.5428E−04 | −4.8310E−05 | 6.6893E−07 | 2.5193E−07 |
| S3 | 5.2521E−03 | −9.4865E−04 | 1.5546E−04 | −2.8446E−05 | 2.6212E−06 |
| S4 | 2.9939E−03 | −1.4940E−04 | 2.4364E−04 | −1.5008E−04 | 2.6038E−05 |
| S5 | 2.6235E−03 | 1.8505E−04 | 2.6442E−06 | −1.9019E−05 | 3.0540E−06 |

TABLE 14-continued

| | | | | | |
|---|---|---|---|---|---|
| S6 | 1.1860E−02 | −4.9241E−03 | 7.3621E−03 | −5.9519E−03 | 2.7140E−03 |
| S7 | 1.6592E−02 | −3.8401E−03 | 3.6620E−03 | −2.2321E−03 | 7.6254E−04 |
| S8 | 2.9287E−03 | −2.2594E−03 | −8.1135E−06 | 1.1774E−04 | −3.5878E−05 |
| S9 | 5.3099E−03 | −3.4706E−03 | 7.0440E−04 | −5.5807E−05 | −2.4699E−05 |
| S10 | −5.9106E−03 | 8.8823E−05 | 3.8390E−04 | −8.5635E−05 | −1.1464E−08 |
| S11 | −1.2967E−03 | −2.3624E−04 | 9.5198E−05 | −1.2861E−05 | 9.7993E−07 |
| S12 | 5.1720E−04 | −3.5992E−04 | 3.8966E−05 | −2.1353E−06 | 5.5908E−08 |

| Surface number | A14 | A16 | A18 | A20 |
|---|---|---|---|---|
| S1 | −1.3902E−11 | 5.5861E−14 | 0.0000E+00 | 0.0000E+00 |
| S2 | −1.9840E−08 | 4.1010E−10 | 0.0000E+00 | 0.0000E+00 |
| S3 | −1.1233E−07 | 1.8390E−09 | 0.0000E+00 | 0.0000E+00 |
| S4 | −1.8620E−06 | 4.8401E−08 | 0.0000E+00 | 0.0000E+00 |
| S5 | −1.2551E−07 | −1.5010E−09 | 0.0000E+00 | 0.0000E+00 |
| S6 | −6.4773E−04 | 6.2924E−05 | 0.0000E+00 | 0.0000E+00 |
| S7 | −1.3740E−04 | 1.0077E−05 | 0.0000E+00 | 0.0000E+00 |
| S8 | 5.2722E−06 | −2.9060E−07 | 0.0000E+00 | 0.0000E+00 |
| S9 | 6.6855E−06 | −4.5616E−07 | 0.0000E+00 | 0.0000E+00 |
| S10 | 2.9357E−06 | −4.9957E−07 | 3.4708E−08 | −8.9109E−10 |
| S11 | −4.6065E−08 | 1.3256E−09 | −2.1439E−11 | 1.4901E−13 |
| S12 | −7.2564E−12 | −4.1362E−11 | 1.0519E−12 | −9.0496E−15 |

Figure 14A:
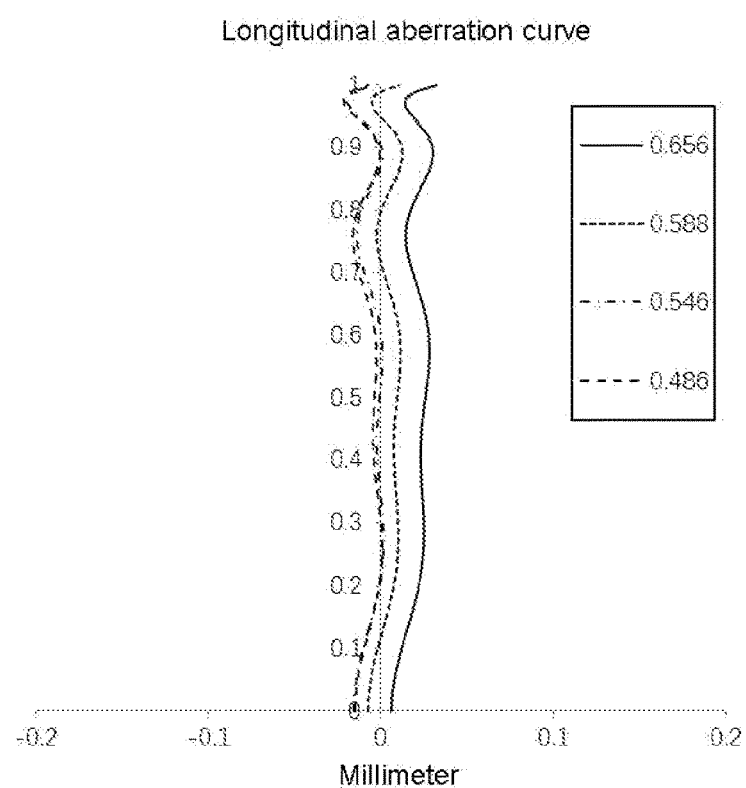
FIGS. 14A-14C show an optical imaging lens group, an astigmatism curve and a relative illuminance curve of the optical imaging lens assembly in Embodiment 7 respectively.
Figure 14B:
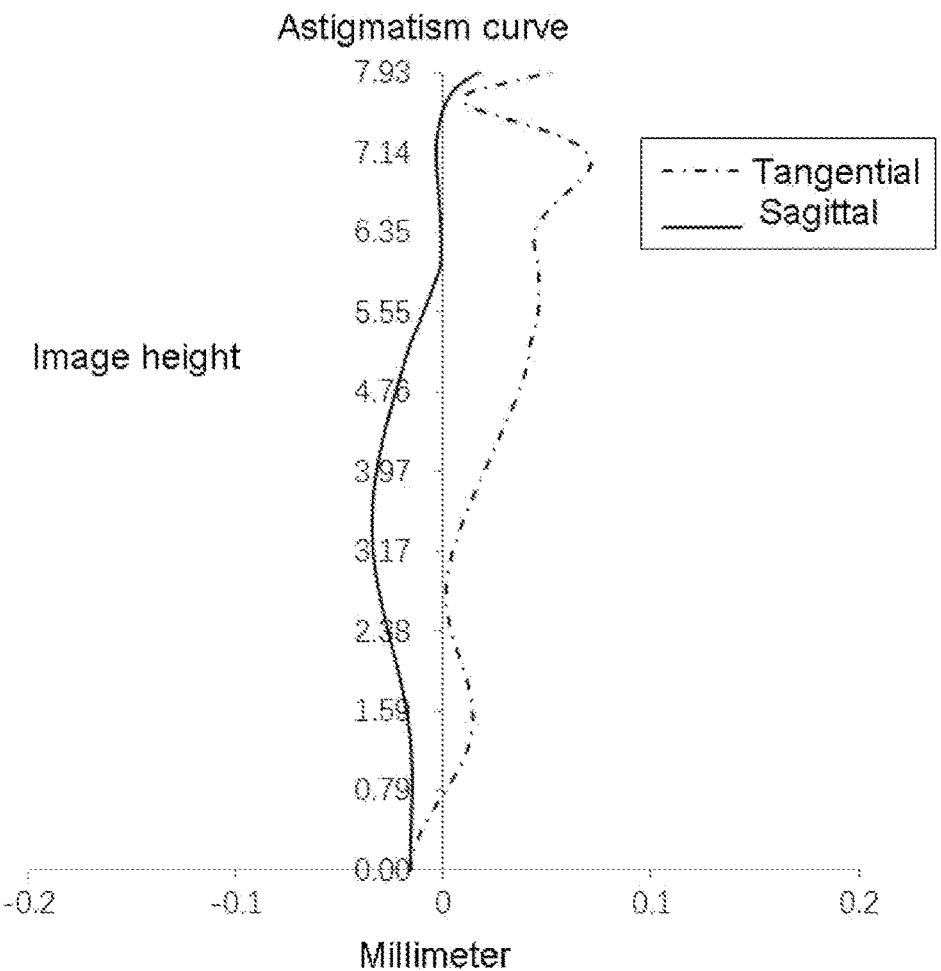
Figure 14C:
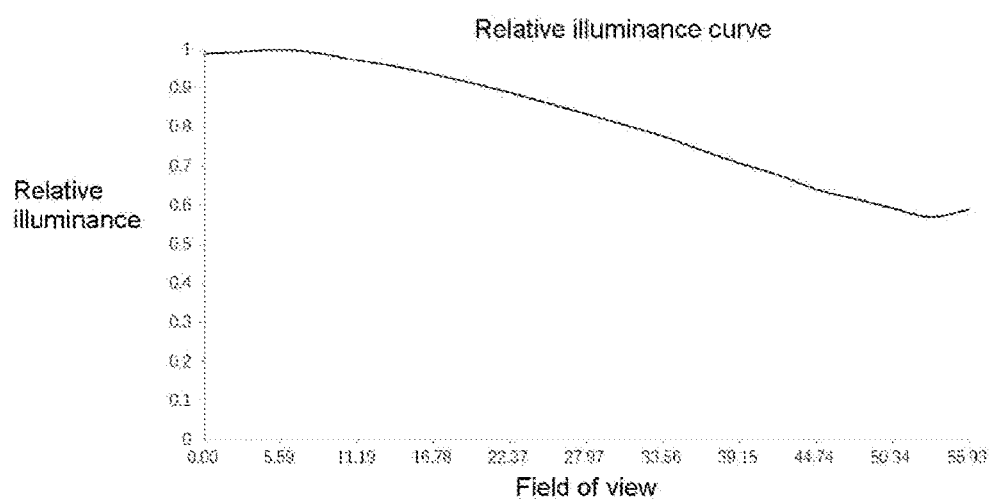

FIG. 14A shows an optical imaging lens group of the optical imaging lens assembly in Embodiment 7, which represents that a convergence focus of light rays of different wavelengths is deviated after the light rays pass through the lens. FIG. 14B shows an astigmatism curve of the optical imaging lens assembly of Embodiment 7, which represents a curvature of tangential image surface and a curvature of sagittal image surface. FIG. 14C shows a relative illuminance curve of the optical imaging lens assembly of Embodiment 7, which represents relative illuminance values corresponding to different fields of view. FIGS. 14A-14C show that the optical imaging lens assembly provided in Embodiment 7 is capable of achieving good imaging quality.

To summarize, Embodiment 1-7 separately satisfy relations shown in Table 15.

TABLE 15

| Conditional Expression | embodiment | | | | | | |
|---|---|---|---|---|---|---|---|
| | 1 | 2 | 3 | 4 | 5 | 6 | 7 |
| tan (Semi-FOV) | 4.93 | 4.52 | 2.51 | 3.59 | 4.52 | 2.23 | 1.48 |
| |R9/f5| | 1.36 | 1.22 | 1.25 | 1.22 | 1.22 | 2.11 | 1.79 |
| f6/f | 2.07 | 2.53 | 2.33 | 2.42 | 2.53 | 3.41 | 2.08 |
| (CT1 + CT2 + CT3)/T12 | 6.87 | 4.74 | 3.93 | 3.92 | 4.74 | 3.65 | 5.12 |
| R7/f | 7.10 | 2.14 | 2.42 | 2.03 | 2.14 | 4.45 | 2.37 |
| ΣCT/ΣAT | 2.87 | 2.34 | 2.37 | 2.27 | 2.34 | 2.39 | 3.30 |
| T45/T56 | 0.14 | 0.43 | 0.86 | 0.27 | 0.43 | 0.19 | 0.56 |
| |SAG22/SAG42| | 1.86 | 1.57 | 1.77 | 1.60 | 1.57 | 1.45 | 1.57 |
| f23/f | 1.68 | 2.02 | 1.95 | 2.20 | 2.02 | 1.53 | 1.35 |
| (ET1 + ET2)/T12 | 5.65 | 3.44 | 3.14 | 3.14 | 3.44 | 2.85 | 3.63 |
| TD/TTL | 0.75 | 0.75 | 0.72 | 0.74 | 0.75 | 0.73 | 0.73 |
| TTL/BFL | 3.95 | 3.97 | 3.61 | 3.84 | 3.36 | 3.48 | 5.00 |
| (|SAG51| + |SAG52|)/CT5 | 1.39 | 1.54 | 3.41 | 1.80 | 1.54 | 5.58 | 5.99 |

The above description is only description about the preferred embodiments of the disclosure and adopted technical principles. Those skilled in the art should understand that the scope of present disclosure involved in the disclosure is not limited to the technical solutions formed by specifically combining the technical features and should also cover other technical solutions formed by freely combining the technical features or equivalent features thereof without departing from the inventive concept, for example, technical solutions formed by mutually replacing the features and (but not limited to) the technical features with similar functions disclosed in the disclosure.

What is claimed is:

1. An optical imaging lens assembly with six lenses, sequentially comprising from an object side to an image side along an optical axis:
   a first lens having a negative refractive power;
   a second lens having a refractive power;
   a third lens having a refractive power;
   a fourth lens having a refractive power;
   a fifth lens having a refractive power; and
   a sixth lens having a positive refractive power;
   wherein ImgH is a half of a diagonal length of an effective pixel region on an imaging surface of the optical imaging lens assembly, ImgH satisfies:

$ImgH > 5$ mm; and

Semi-FOV is a half of a maximum field of view of the optical imaging lens assembly, Semi-FOV satisfies:

$\tan(\text{Semi-FOV}) > 1.2$.

2. The optical imaging lens assembly according to claim 1, wherein RI is a relative illuminance corresponding to the maximum field of view of the optical imaging lens assembly, RI satisfies:

$RI \geq 40\%$.

3. The optical imaging lens assembly according to claim 1, wherein R9 is a curvature radius of an object-side surface of the fifth lens, and f5 is an effective focal length of the fifth lens, R9 and f5 satisfy:

$1.0 < |f5/R9| < 2.5$.

4. The optical imaging lens assembly according to claim 1, wherein f6 is an effective focal length of the sixth lens, and f is a total effective focal length of the optical imaging lens assembly, f6 and f satisfy:

$2.00 < f6/f < 3.50$.

5. The optical imaging lens assembly according to claim 1, wherein $3.50 < (CT1+CT2+CT3)/T12 < 7.00$, wherein CT1 is a center thickness of the first lens on the optical axis, CT2 is a center thickness of the second lens on the optical axis, CT3 is a center thickness of the third lens on the optical axis, and T12 is an air gap between the first lens and the second lens on the optical axis.

6. The optical imaging lens assembly according to claim 1, wherein R7 is a curvature radius of an object-side surface of the fourth lens, and f is a total effective focal length of the optical imaging lens assembly, R7 and f satisfy:

2.0<R7/f<7.5.

7. The optical imaging lens assembly according to claim 1, wherein ΣCT is the sum of center thicknesses of the first lens to the sixth lens on the optical axis, and ΣAT is the sum of the spacing distances between any two adjacent lenses of the first lens to the sixth lens on the optical axis, ΣCT and ΣAT satisfy:

2.0<ΣCT/ΣAT<3.5.

8. The optical imaging lens assembly according to claim 1, wherein T45 is an air gap between the fourth lens and the fifth lens on the optical axis, and T56 is an air gap between the fifth lens and the sixth lens on the optical axis, T45 and T56 satisfy:

T45/T56<1.0.

9. The optical imaging lens assembly according to claim 1, wherein 1.4<|SAG22/SAG42|<2.0, SAG22 is an on-axis distance from an intersection point of an image-side surface of the second lens and the optical axis to an effective radius vertex of the image-side surface of the second lens, and SAG42 is an on-axis distance from an intersection point of an image-side surface of the fourth lens and the optical axis to an effective radius vertex of the image-side surface of the fourth lens.

10. The optical imaging lens assembly according to claim 1, wherein f23 is a combined focal length of the second lens and the third lens, and f is a total effective focal length of the optical imaging lens assembly, f23 and f meet 1.0<f23/f<2.5.

11. The optical imaging lens assembly according to claim 1, wherein ET1 is an edge thickness of the first lens, ET2 is an edge thickness of the second lens, and T12 is an air gap between the first lens and the second lens on the optical axis, ET1, ET2 and T12 meet 2.5<(ET1+ET2)/T12<6.0.

12. The optical imaging lens assembly according to claim 1, wherein TTL is a distance from an object-side surface of the first lens to the imaging surface on the optical axis, and TD is a distance from the object-side surface of the first lens to the image-side surface of the sixth lens on the optical axis, TTL and TD meet 0.7<TD/TTL<0.8.

13. The optical imaging lens assembly according to claim 1, wherein TTL is a distance from an object-side surface of the first lens to the imaging surface on the optical axis, and BFL is a distance from an image-side surface of the sixth lens to the imaging surface on the optical axis, TTL and BFL meet 3.0<TTL/BFL≤5.0.

14. The optical imaging lens assembly according to claim 1, wherein 1.30<(|SAG51|+|SAG52|)/CT5<6.00, SAG51 is an on-axis distance from an intersection point of an object-side surface of the fifth lens and the optical axis to an effective radius vertex of the object-side surface of the fifth lens, SAG52 is an on-axis distance from an intersection point of the image-side surface of the fifth lens and the optical axis to an effective radius vertex of the image-side surface of the fifth lens, and CT5 is a center thickness of the fifth lens on the optical axis.

15. An optical imaging lens assembly with six lenses, sequentially comprising from an object side to an image side along an optical axis:
   a first lens having a refractive power, an object-side surface thereof being a concave surface;
   a second lens having a refractive power;
   a third lens having a refractive power, an object-side surface thereof being a convex surface;
   a fourth lens having a refractive power;
   a fifth lens having a refractive power; and
   a sixth lens having a positive refractive power;
   wherein ImgH is a half of a diagonal length of an effective pixel region on an imaging surface of the optical imaging lens assembly, ImgH satisfies:

ImgH>5 mm.

16. The optical imaging lens assembly according to claim 15, wherein RI is a relative illuminance corresponding to the maximum field of view of the optical imaging lens assembly, RI satisfy: RI≥40%.

17. The optical imaging lens assembly according to claim 15, wherein R9 is a curvature radius of an object-side surface of the fifth lens, and f5 is an effective focal length of the fifth lens, R9 and f5 satisfy: 1.0<|f5/R9|<2.5.

18. The optical imaging lens assembly according to claim 15, wherein f6 is an effective focal length of the sixth lens, and f is a total effective focal length of the optical imaging lens assembly, f6 and f satisfy: 2.00<f6/f<3.50.

19. The optical imaging lens assembly according to claim 15, wherein 3.50<(CT1+CT2+CT3)/T12<7.00

CT1 is a center thickness of the first lens on an optical axis, CT2 is a center thickness of the second lens on the optical axis, CT3 is a center thickness of the third lens on the optical axis, and T12 is an air gap between the first lens and the second lens on the optical axis.

20. The optical imaging lens assembly according to claim 15, wherein R7 is a curvature radius of an object-side surface of the fourth lens, and f is a total effective focal length of the optical imaging lens assembly, R7 and f satisfy: 2.0<R7/f<7.5.

* * * * *